(12) United States Patent
Kim et al.

(10) Patent No.: US 12,512,938 B2
(45) Date of Patent: Dec. 30, 2025

(54) TRANSMITTING SOUND REFERENCE SIGNALS (SRSs) BASED ON PHYSICAL DOWNLINK SHARED CHANNEL (PDSCH) SCHEDULING RATE

(71) Applicant: SAMSUNG ELECTRONICS CO., LTD., Suwon-si (KR)

(72) Inventors: Hyeonsoo Kim, Suwon-si (KR); Daejun Kang, Suwon-si (KR); Sangwon Kim, Suwon-si (KR); Keonyoung Lee, Suwon-si (KR); Yongjae Jung, Suwon-si (KR); Junsuk Kim, Suwon-si (KR); Jinwoo Kim, Suwon-si (KR); Minho Yang, Suwon-si (KR); Hyoungjoo Lee, Suwon-si (KR); Yonggue Han, Suwon-si (KR); Junyoung Woo, Suwon-si (KR); Sanggeun Lee, Suwon-si (KR); Juhyun Lee, Suwon-si (KR); Chaiman Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 374 days.

(21) Appl. No.: 18/297,242

(22) Filed: Apr. 7, 2023

(65) Prior Publication Data
US 2023/0246776 A1 Aug. 3, 2023

Related U.S. Application Data

(63) Continuation of application No. PCT/KR2021/013690, filed on Oct. 6, 2021.

(30) Foreign Application Priority Data

Oct. 7, 2020 (KR) .................. 10-2020-0129412

(51) Int. Cl.
H04L 5/00 (2006.01)
H04W 52/22 (2009.01)

(52) U.S. Cl.
CPC ......... *H04L 5/0048* (2013.01); *H04W 52/228* (2013.01)

(58) Field of Classification Search
CPC ... H04L 5/0048; H04L 5/0023; H04L 5/0044; H04L 5/0051; H04L 5/0064;
(Continued)

(56) References Cited

U.S. PATENT DOCUMENTS

2007/0270175 A1 11/2007 Malladi et al.
2012/0083211 A1 4/2012 Jeon
(Continued)

FOREIGN PATENT DOCUMENTS

JP 2019514268 A 5/2019
KR 20080108314 A 12/2008
(Continued)

OTHER PUBLICATIONS

"Enhancements on SRS flexibility, coverage and capacity", R1-2005622, Source: MediaTek Inc., e-Meeting, Aug. 17-28, 2020, 7 pages.
(Continued)

*Primary Examiner* — Jackie Zuniga Abad
*Assistant Examiner* — Latresa A Mccallum
(74) *Attorney, Agent, or Firm* — Nixon & Vanderhye, P.C.

(57) ABSTRACT

An example electronic device may include multiple antennas and at least one processor, wherein the at least one processor is configured to: identify a sounding reference signal (SRS) configuration received from a network; identify a physical downlink shared channel (PDSCH) scheduling rate corresponding to the electronic device; transmit, based on the PDSCH scheduling rate not being included in a first
(Continued)

range, at least one SRS at the magnitude of first transmission power, in each of one or more resource for SRS signal transmission identified on the basis of the SRS configuration; and refrain from transmitting the at least one SRS in the one or more resources based on the PDSCH scheduling rate being included in the first range, or transmit the at least one SRS at the magnitude of second transmission power, in the each of the one or more resources.

20 Claims, 17 Drawing Sheets

(58) Field of Classification Search
CPC . H04W 52/228; H04W 52/146; H04W 52/16; H04W 52/32; H04W 52/325; H04W 52/346; H04W 52/367; H04W 52/42; H04W 72/04; H04W 72/12; H04W 72/127; H04W 72/21; H04B 7/0602
See application file for complete search history.

(56) References Cited

U.S. PATENT DOCUMENTS

| | | |
|---|---|---|
| 2014/0219232 A1 | 8/2014 | Takeda et al. |
| 2017/0111891 A1 | 4/2017 | He et al. |
| 2017/0208568 A1* | 7/2017 | Nam .................... H04L 5/0091 |
| 2017/0290041 A1 | 10/2017 | Rico Alvarino et al. |
| 2017/0302419 A1 | 10/2017 | Liu et al. |
| 2019/0261280 A1* | 8/2019 | Jung .................... H04W 52/50 |
| 2020/0112349 A1 | 4/2020 | Yang et al. |
| 2020/0204407 A1 | 6/2020 | Liu et al. |
| 2020/0314748 A1 | 10/2020 | Kim et al. |
| 2020/0351130 A1 | 11/2020 | Chen et al. |
| 2020/0382250 A1 | 12/2020 | Choi et al. |
| 2021/0051767 A1 | 2/2021 | Zhang et al. |
| 2022/0060265 A1 | 2/2022 | Xu et al. |
| 2022/0286967 A1 | 9/2022 | Yang et al. |
| 2023/0127256 A1* | 4/2023 | Cha .................... H04W 52/242 370/318 |

FOREIGN PATENT DOCUMENTS

| | | |
|---|---|---|
| KR | 20120034464 A | 4/2012 |
| KR | 20170020501 A | 2/2017 |
| KR | 20200022502 A | 3/2020 |
| KR | 20200108290 A | 9/2020 |
| KR | 20220047818 A | 4/2022 |
| WO | 2014020815 A1 | 2/2014 |
| WO | 2021087845 A1 | 5/2021 |

OTHER PUBLICATIONS

International Search Report for PCT/KR2021/013690, mailed Jan. 7, 2022, 3 pages.
Written Opinion of the ISA for PCT/KR2021/013690, mailed Jan. 7, 2022, 3 pages.

* cited by examiner

TRANSMITTING SOUND REFERENCE SIGNALS (SRSs) BASED ON PHYSICAL DOWNLINK SHARED CHANNEL (PDSCH) SCHEDULING RATE

CROSS-REFERENCE TO RELATED APPLICATIONS

This application is a continuation of International Application No. PCT/KR2021/013690, designating the United States, filed on Oct. 6, 2021, in the Korean Intellectual Property Receiving Office and claiming priority to Korean Patent Application No. 10-2020-0129412, filed on Oct. 7, 2020 in the Korean Intellectual Property Office. The disclosures of each of these applications are incorporated by reference herein in their entireties.

BACKGROUND

Field

The disclosure relates to an electronic device for transmitting a reference signal and an operating method thereof.

Description of Related Art

As the use of portable terminals providing various functions has become common due to the recent advances of mobile communication technology, efforts are being made to develop a 5G communication system to meet the growing demand for wireless data traffic. In addition to the frequency band used in the 3G communication system and the long-term evolution (LTE) communication system, implementation in a higher frequency band (e.g., 25-60 GHz band) is being considered to provide a faster data transmission rate in order to achieve a high data transmission rate in the 5G communication system.

For example, in order to mitigate the path loss of radio waves and increase the propagation distance of radio waves in the mmWave band, beamforming, massive MIMO, full dimensional MIMO (FD-MIMO), array antenna, analog beamforming, and large scale antenna technologies are being discussed in the 5G communication system.

In order to transmit a signal from an electronic device to a communication network (e.g., a base station), data generated by a processor or a communication processor in the electronic device may be signal-processed through a radio frequency integrated circuit (RFIC) and a radio frequency front end (RFFE) circuit (hereinafter referred to as 'RFFE' for convenience of description), and then transmitted to the outside of the electronic device through an antenna.

The electronic device may transmit a reference signal (e.g., a sounding reference signal (SRS)) referred to for channel estimation in a base station of the communication network to at least one antenna through the RFFE. The base station may perform multi-antenna signal processing or beamforming processing by estimating a channel based on a reference signal transmitted from the electronic device. The electronic device may improve data reception performance by receiving a multi-antenna signal processed or beamforming processed signal from the base station.

SUMMARY

In order to obtain the maximum gain of downlink throughput through SRS switching, SRS transmission is required for all downlink bands. For a gain of relatively high downlink throughput, the electronic device transmits the SRS with a relatively high transmission power, and thus a relatively large amount of current may be consumed.

However, even if the SRS is transmitted with a relatively high power, there is a case in which the gain of downlink throughput is not large. In the 3rd generation partnership project (3GPP), a case in which SRS transmission is restricted (e.g., in a sleep state of connected discontinuous reception (CDRX)) is specified, but this is not related to the gain of downlink throughput. Accordingly, even when the gain of downlink throughput is not large, current consumption may be large by transmitting the SRS with high transmission power.

Electronic devices and operating methods according to various embodiments may not transmit an SRS or transmit an SRS of a relatively small power when the gain of downlink throughput is not expected to be large.

According to various example embodiments, an electronic device may include a plurality of antennas and at least one processor, wherein the at least one processor may be configured to identify a sounding reference signal (SRS) configuration received from a network, identify a physical downlink shared channel (PDSCH) scheduling rate corresponding to the electronic device, transmit, based on the PDSCH scheduling rate not being included in a first range, at least one SRS at a magnitude of first transmission power through each of at least one of the plurality of antennas, in each of at least one resource for SRS signal transmission identified based on the SRS configuration, and refrain from transmitting the at least one SRS in the at least one resource, or transmit the at least one SRS at a magnitude of second transmission power, through at least one of the plurality of antennas, in the at least one resource, based on the PDSCH scheduling rate being included in the first range, wherein the magnitude of the second transmission power is different from the magnitude of the first transmission power. The PDSCH scheduling rate may be a ratio of scheduled slots among total slots of the PDSCH corresponding to the electronic device for a specified period. The SRS configuration may be configured by the network corresponding to the plurality of antennas.

According to various example embodiments, an operation method of an electronic device may include identifying a sounding reference signal (SRS) configuration received from a network, identifying a physical downlink shared channel (PDSCH) scheduling rate corresponding to the electronic device, transmitting, based on the PDSCH scheduling rate not being included in a first range, at least one SRS at a magnitude of first transmission power in each of at least one resource for SRS signal transmission identified based on the SRS configuration, through each of at least one antenna among a plurality of antennas of the electronic device, refraining from transmitting the at least one SRS in the at least one resource, or transmitting the at least one SRS at a magnitude of second transmission power, in the at least one resource through at least one antenna among the plurality of antennas, based on the PDSCH scheduling rate being included in the first range, wherein the magnitude of the second transmission power is different from the magnitude of the first transmission power. The PDSCH scheduling rate may be a ratio of scheduled slots among total slots of the PDSCH corresponding to the electronic device for a specified period. The SRS configuration may be configured by the network corresponding to the plurality of antennas of the electronic device.

According to various embodiments, an electronic device and operating method capable of not transmitting an SRS or transmitting a relatively small SRS when a gain of downlink throughput is not expected to be large may be provided. Accordingly, when the gain of downlink throughput is not large, an unnecessarily high current may not be consumed.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
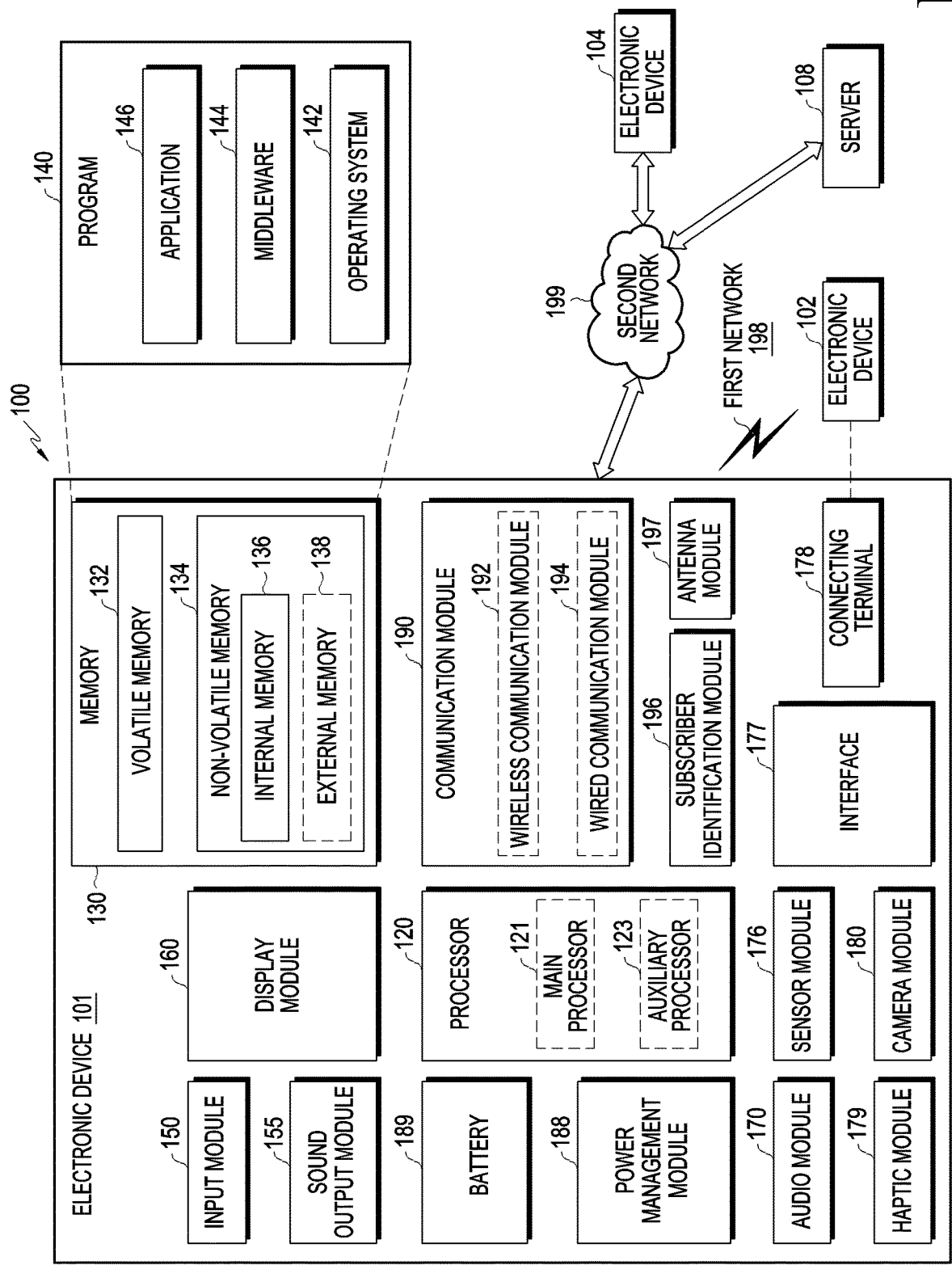
FIG. 1 is a block diagram of an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his/her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
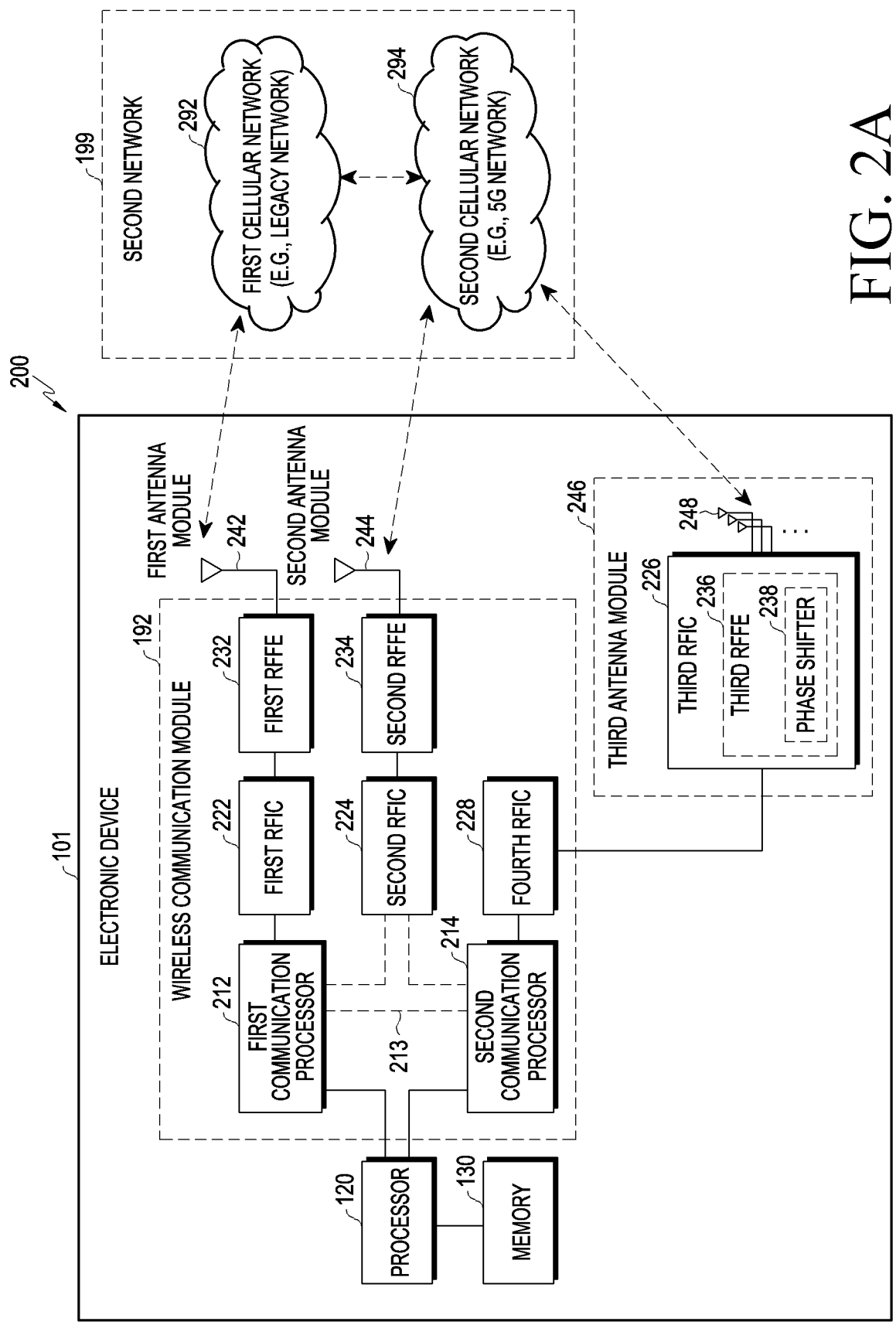
FIGS. 2A and 2B are block diagrams of an example electronic device for supporting legacy network communication and 5G network communication according to various embodiments.

FIG. 2A is a block diagram 200 of an example electronic device 101 for supporting legacy network communication and 5G network communication according to various embodiments. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246 and antennas 248. The electronic device 101 may further include a processor 120 and a memory 130. A second network 199 may include a first cellular network 292 and a second cellular network 294. According to an embodiment, the electronic device 101 may further include at least one component among the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may configure at least a part of the wireless communication module 192. According to an embodiment, the fourth RFIC 228 may be omitted or may be included as a part of the third RFIC 226.

The first communication processor 212 may support establishment of a communication channel of a band to be used for wireless communication with the first cellular network 292, and legacy network communication through the established communication channel According to various embodiments, the first cellular network may be a legacy network including a second generation (2G), 3G, 4G, or long-term evolution (LTE) network. The second communication processor 214 may support establishment of a communication channel corresponding to a specified band (e.g., about 6 GHz to about 60 GHz) among bands to be used for wireless communication with the second cellular network 294, and 5G network communication through an established communication channel. According to various embodiments, the second cellular network 294 may be a 5G network defined by 3GPP. Additionally, according to an embodiment, the first communication processor 212 or the second communication processor 214 may support establishment of a communication channel corresponding to another specified band (e.g., about 6 GHz or less) among bands to be used for wireless communication with the second cellular network 294, and 5G network communication through an established communication channel.

The first communication processor 212 may transmit and receive data to and from the second communication processor 214. For example, data that has been classified to be transmitted through the second cellular network 294 may be changed to be transmitted through the first cellular network 292. In this case, the first communication processor 212 may receive transmission data from the second communication processor 214. For example, the first communication processor 212 may transmit and receive data to and from the second communication processor 214 through an inter-processor interface 213. The inter-processor interface 213 may be implemented as, for example, a universal asynchronous receiver/transmitter (UART), (e.g., high speed-UART (HS-UART) or a peripheral component interconnect bus express (PCIe) interface), but there is no limitation in the interface type thereof. Alternatively, the first communication processor 212 and the second communication processor 214 may exchange control information and packet data information using, for example, a shared memory. The first communication processor 212 may transmit and receive various information to and from the second communication processor 214, such as sensing information, information on output strength, and resource block (RB) allocation information.

Depending on the implementation, the first communication processor 212 may not be directly connected to the second communication processor 214. In this case, the first communication processor 212 may transmit and receive data to and from the second communication processor 214 through the processor 120 (e.g., an application processor). For example, the first communication processor 212 and the second communication processor 214 may transmit and receive data to and from the processor 120 (e.g., an application processor) through the HS-UART interface or the PCIe interface, but the type of interface is not limited. Alternatively, the first communication processor 212 and the second communication processor 214 may exchange control information and packet data information using a shared memory with the processor 120 (e.g., an application processor).

Figure 2B:
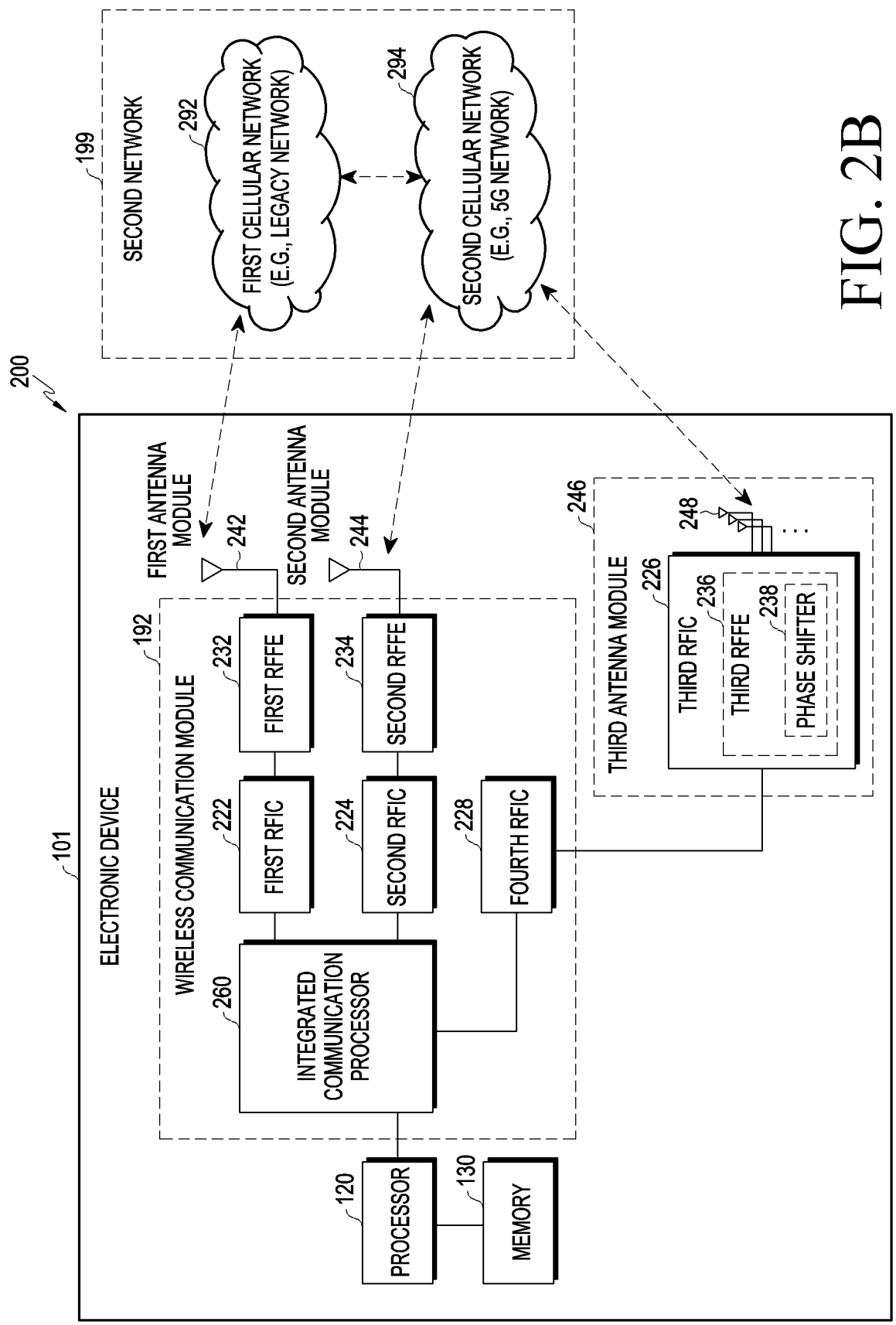

According to an embodiment, the first communication processor 212 and the second communication processor 214 may be implemented in a single chip or a single package. According to various embodiments, the first communication processor 212 or the second communication processor 214 may be configured in a single chip or a single package with the processor 120, an auxiliary processor 123, or a communication module 190. For example, as illustrated in FIG. 2B, a unified communication processor 260 may support both functions for communication with the first cellular network 292 and the second cellular network 294.

The first RFIC 222, on transmission, may convert the baseband signal generated by the first communication processor 212 into a radio frequency (RF) signal of about 700 MHz to about 3 GHz used in the first cellular network 292 (e.g., a legacy network). On reception, an RF signal may be obtained from the first network 292 (e.g., a legacy network) through an antenna (e.g., the first antenna module 242), and may be preprocessed through an RFFE (e.g., the first RFFE 232). The first RFIC 222 may convert the preprocessed RF signal into a baseband signal to be processed by the first communication processor 212.

The second RFIC 224 may, on transmission, convert the baseband signal generated by the first communication processor 212 or the second communication processor 214 into an RF signal (hereinafter, 5G Sub6 RF signal) of the Sub6 band (e.g., about 6 GHz or less) used for the second cellular network 294 (e.g., a 5G network). On reception, a 5G Sub6 RF signal may be obtained from the second cellular network 294 (e.g., 5G network) through an antenna (e.g., second antenna module 244), and may be preprocessed through an RFFE (e.g., the second RFFE 234). The second RFIC 224 may convert the preprocessed 5G Sub6 RF signal into a baseband signal to be processed by a corresponding one of the first communication processor 212 or the second communication processor 214.

The third RFIC 226 may convert the baseband signal generated by the second communication processor 214 into an RF signal (hereinafter, 5G Above6 RF signal) of the 5G Above6 band (e.g., about 6 GHz to about 60 GHz) to be used in the second cellular network 294 (e.g., a 5G network). On reception, a 5G Above6 RF signal may be obtained from the second cellular network 294 (e.g., 5G network) through antennas (e.g., antennas 248), and may be preprocessed through a third RFFE 236. The third RFIC 226 may convert the preprocessed 5G Above6 RF signal into a baseband signal to be processed by the second communication processor 214. According to an embodiment, the third RFFE 236 may be configured as a part of the third RFIC 226.

According to an embodiment, the electronic device 101 may include the fourth RFIC 228 separately from or as at least a part of the third RFIC 226. In this case, the fourth RFIC 228 may convert the baseband signal generated by the second communication processor 214 into an RF signal (hereinafter, referred to as an IF signal) of an intermediate frequency band (e.g., about 9 GHz to about 11 GHz), and then transmit the IF signal to the third RFIC 226. The third RFIC 226 may convert the IF signal into a 5G Above6 RF signal. On reception, the 5G Above6 RF signal may be received from the second cellular network 294 (e.g., 5G network) through antennas (e.g., antennas 248) and converted to an IF signal by the third RFIC 226. The fourth RFIC 228 may convert the IF signal into a baseband signal to be processed by the second communication processor 214.

According to an embodiment, the first RFIC 222 and the second RFIC 224 may be implemented as at least a part of a single chip or a single package. According to various embodiments, when the first RFIC 222 and the second RFIC 224 in FIG. 2A or 2B are implemented as a single chip or a single package, they may be implemented as an integrated RFIC. In this case, the integrated RFIC may be connected to the first RFFE 232 and second RFFE 234 to convert a baseband signal into a signal of a band supported by the first RFFE 232 and/or second RFFE 234, and transmit the converted signal to one of the first RFFE 232 and the second RFFE 234. According to an embodiment, the first RFFE 232 and the second RFFE 234 may be implemented as at least a part of a single chip or a single package. According to an embodiment, at least one antenna module of the first antenna module 242 or the second antenna module 244 may be omitted or may be combined with another antenna module to process RF signals of a plurality of corresponding bands.

According to an embodiment, the third RFIC 226 and the antennas 248 may be disposed on the same substrate to configure the third antenna module 246. For example, the wireless communication module 192 or the processor 120 may be disposed on the first substrate (e.g., main PCB). In this case, the third RFIC 226 may be disposed in a partial area (e.g., bottom) of the second substrate (e.g., sub PCB) separate from the first substrate, and the antennas 248 may be disposed in another partial area (e.g., top), thereby configuring the third antenna module 246. By disposing the third RFIC 226 and the antennas 248 on the same substrate, it is possible to reduce the length of the transmission line therebetween. This, for example, may reduce loss (e.g., attenuation) of a signal in a high-frequency band (e.g., about 6 GHz to about 60 GHz) used for 5G network communication by the transmission line. Accordingly, the electronic device 101 may improve the quality or speed of communication with the second network 294 (e.g., a 5G network).

According to an embodiment, the antennas 248 may be configured as an antenna array including a plurality of antenna elements that may be used for beamforming. In this case, the third RFIC 226 may include, for example, as part of the third RFFE 236, a plurality of phase shifters 238 corresponding to a plurality of antenna elements. On transmission, each of the plurality of phase shifters 238 may convert the phase of a 5G Above6 RF signal to be transmitted to the outside (e.g., a base station of a 5G network) of the electronic device 101 through a corresponding antenna element. On reception, each of the plurality of phase shifters 238 may convert the phase of the 5G Above6 RF signal received from the outside through a corresponding antenna element into the same or substantially the same phase. This enables transmission or reception through beamforming between the electronic device 101 and the outside.

The second cellular network 294 (e.g., 5G networks) may operate independently (e.g., Stand Alone (SA)) of the first cellular network 292 (e.g., legacy networks) or may be connected and operated (e.g., Non-Stand Alone (NSA)). For example, a 5G network may have only an access network (e.g., a 5G radio access network (RAN) or a next generation RAN (NG RAN)), and may not have a core network (e.g., a next generation core (NGC)). In this case, after accessing the access network of the 5G network, the electronic device 101 may access an external network (e.g., the Internet) under the control of a core network (e.g., evolved packed core (EPC)) of the legacy network. Protocol information (e.g., LTE protocol information) for communication with a legacy network or protocol information (e.g., New Radio (NR) protocol information) for communication with a 5G network may be stored in the memory 130 and may be accessed by other components (e.g., the processor 120, the first communication processor 212, or the second communication processor 214).

Figure 3A:
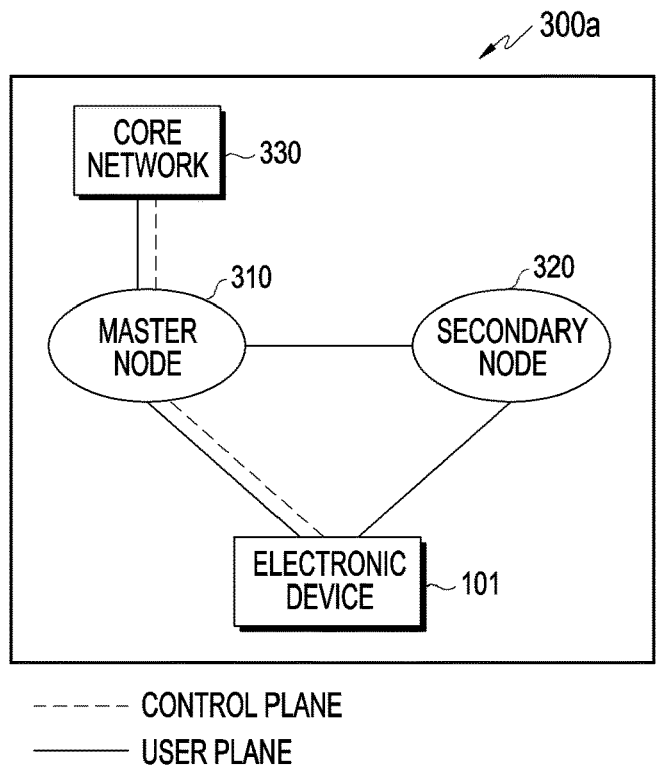
FIGS. 3A, 3B, and 3C are diagrams illustrating example wireless communication systems providing a network of legacy communication and/or 5G communication according to various embodiments.
Figure 3B:
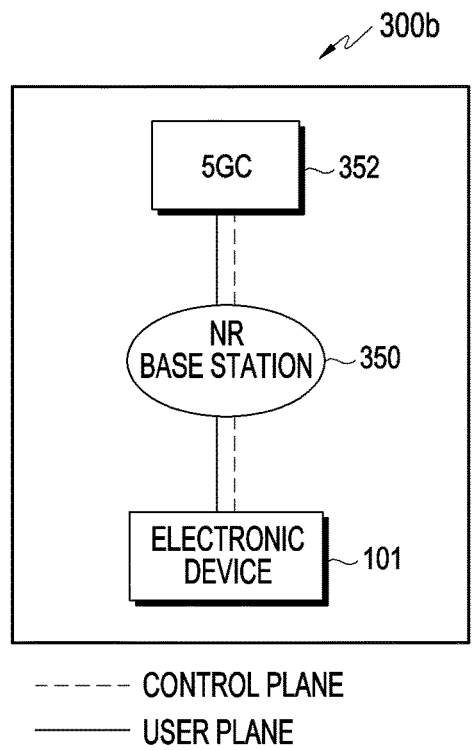
Figure 3C:
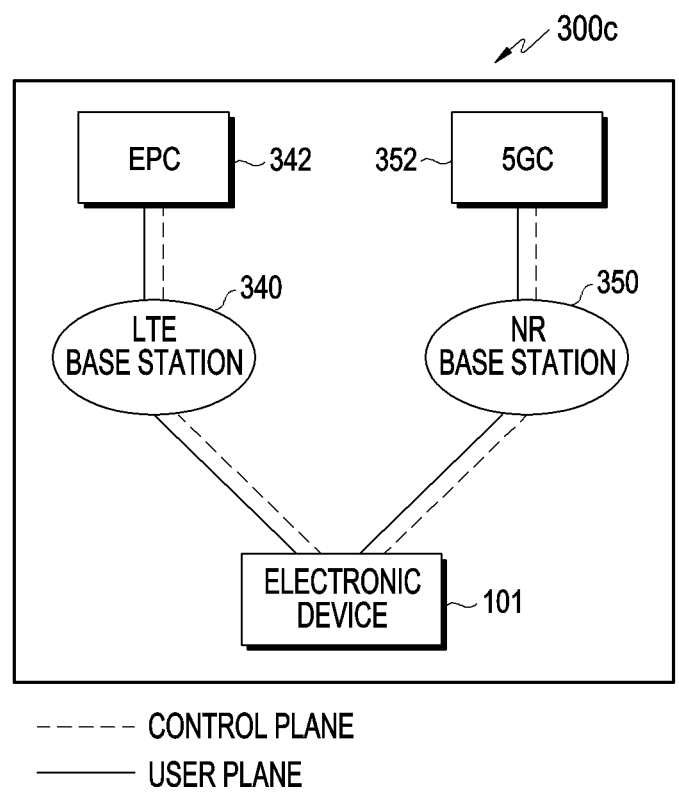

FIGS. 3A, 3B, and 3C are diagrams illustrating wireless communication systems providing a network of legacy communication and/or 5G communication according to various embodiments. Referring to FIGS. 3A, 3B, and 3C, network environments 300a to 300c may include at least one of a legacy network and a 5G network. The legacy network may include, for example, a 4G or LTE base station 340 (e.g., eNodeB (eNB)) of the 3GPP standard supporting radio access with the electronic device 101 and an evolved packet core (EPC) 342 managing 4G communication. The 5G network may include, for example, a new radio (NR) base station 350 (e.g., gNodeB (gNB)) supporting radio access with the electronic device 101 and a 5th generation core (5GC) 352 managing 5G communication of the electronic device 101.

According to various embodiments, the electronic device 101 may transmit and receive a control message and user data through legacy communication and/or 5G communication. The control message may include, for example, a message related to at least one of security control, bearer setup, authentication, registration, and mobility management of the electronic device 101. The user data may refer to, for example, user data excluding control messages transmitted and received between the electronic device 101 and the core network 330 (e.g., the EPC 342).

Referring to FIG. 3A, the electronic device 101 according to an embodiment may transmit/receive at least one of a control message or user data with at least a portion (e.g., the NR base station 350, the 5GC 352) of the 5G network by using at least a portion (e.g., the LTE base station 340, the EPC 342) of the legacy network.

According to various embodiments, the network environment 300a may include a network environment in which a wireless communication dual connectivity (DC) is provided to the LTE base station 340 and the NR base station 350, and control messages are transmitted and received with the electronic device 101 through the core network 330 of either the EPC 342 or the 5GC 352.

According to various embodiments, in a DC environment, one of the LTE base station 340 or the NR base station 350 may operate as a master node (MN) 310 and the other may operate as a secondary node (SN) 320. The MN 310 may be connected to the core network 330 to transmit and receive control messages. The MN 310 and the SN 320 may be connected through a network interface to transmit/receive messages related to radio resource (e.g., a communication channel) management.

According to various embodiments, the MN 310 may include the LTE base station 340, the SN 320 may include the NR base station 350, and the core network 330 may include the EPC 342. For example, a control message may be transmitted and received through the LTE base station 340 and the EPC 342, and user data may be transmitted and received through at least one of the LTE base station 340 or the NR base station 350.

According to various embodiments, the MN 310 may include the NR base station 350, the SN 320 may include the LTE base station 340, and the core network 330 may include the 5GC 352. For example, a control message may be transmitted and received through the NR base station 350 and the 5GC 352, and user data may be transmitted and received through at least one of the LTE base station 340 or the NR base station 350.

Referring to FIG. 3B, according to various embodiments, a 5G network may include the NR base station 350 and the 5GC 352, and control messages and user data may be transmitted and received independently of the electronic device 101.

Referring to FIG. 3C, a legacy network and a 5G network according to various embodiments may independently provide data transmission and reception. For example, the electronic device 101 and the EPC 342 may transmit and receive control messages and user data through the LTE base station 340. For another example, the electronic device 101 and the 5GC 352 may transmit and receive control messages and user data through the NR base station 350.

According to various embodiments, the electronic device 101 may be registered with at least one of the EPC 342 or the 5GC 352 to transmit and receive control messages.

According to various embodiments, the EPC 342 or the 5GC 352 may manage communication of the electronic device 101 by interworking. For example, movement information of the electronic device 101 may be transmitted and received through an interface between the EPC 342 and the 5GC 352.

As described above, dual connectivity through the LTE base station 340 and the NR base station 350 may be referred to as E-UTRA new radio dual connectivity (EN-DC).

Figure 4:
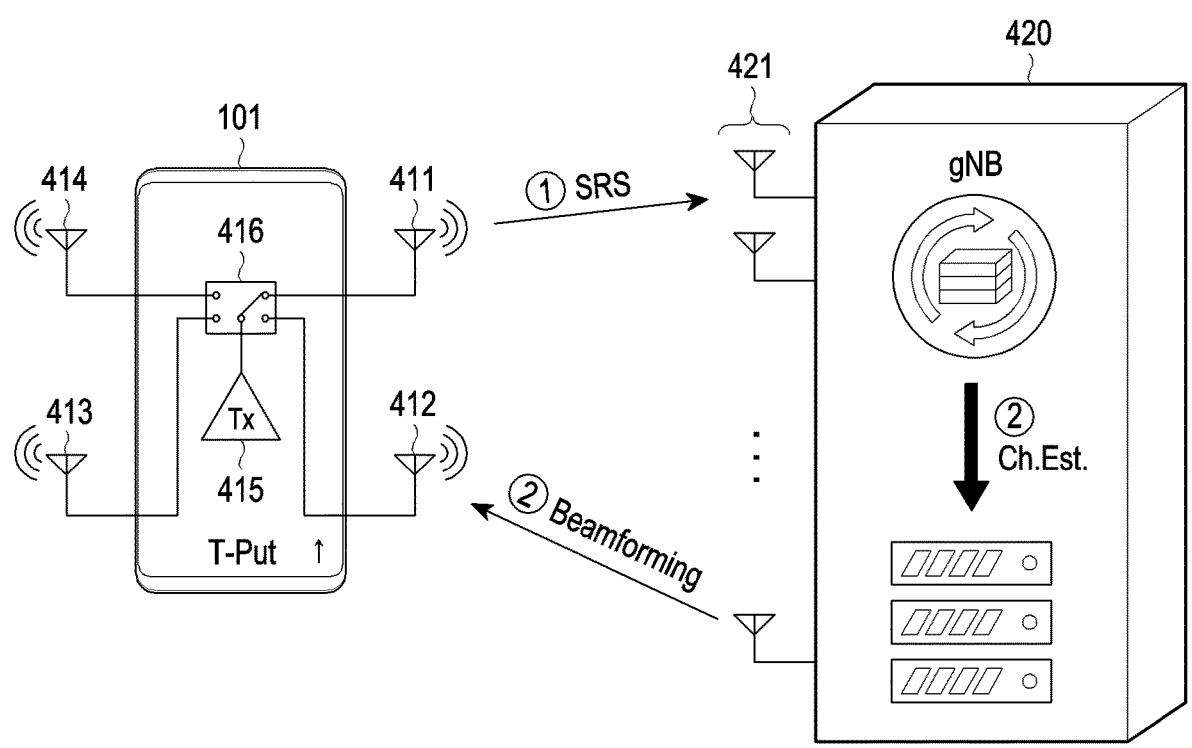
FIG. 4 is a diagram illustrating reference signal transmission of an example electronic device according to various embodiments.

FIG. 4 is a diagram illustrating reference signal transmission of an example electronic device according to various embodiments. Referring to FIG. 4, the electronic device 101 (e.g., the electronic device 101 of FIG. 1) may transmit a reference signal (e.g., SRS) through four antennas (e.g., the first antenna 411, the second antenna 412, the third antenna 413, and the fourth antenna 414). For example, the electronic device 101 may amplify the reference signal through at least one power amplifier (PA) 415, and transmit the amplified reference signal to the first antenna 411, the second antenna 412, the third antenna 413, and the fourth antenna 414 through at least one switch 416. The reference signal (e.g., SRS) transmitted through each antenna (e.g., the first antenna 411, the second antenna 412, the third antenna 413, and the fourth antenna 414) of the electronic device 101 may be received through each antenna 421 of a base station 420 (e.g., gNB).

According to various embodiments, the base station 420 may receive the reference signal transmitted from the electronic device 101 and estimate a channel for each antenna (e.g., the first antenna 411, the second antenna 412, the third antenna 413, and the fourth antenna 414) of the electronic device 410 from the received reference signal. The base station 420 may transmit a pre-coded downlink signal to the electronic device 101 based on the channel estimation. For example, the electronic device 101 and the base station 420 may perform MIMO communication. According to various embodiments, the base station 420 may perform beamforming based on channel estimation in the FR2 band.

In FIG. 4, for convenience of description, the power amplifier 415 and the switch 416 are each illustrated as one component and connected to a plurality of antennas (the first antenna 411, the second antenna 412, the third antenna 413, and the fourth antenna 414), but those skilled in the art will easily understand that the power amplifier 415 and the switch 416 are not limited thereto and may, for example, include multiple amplifiers and/or multiple switches.

As illustrated in FIG. 4, when the electronic device 101 transmits the reference signal (e.g., SRS) through a plurality of transmission paths, the base station 420 may identify the channel environment with each antenna (e.g., the first antenna 411, the second antenna 412, the third antenna 413, and the fourth antenna 414) of the electronic device 101, use the channel environment for precoding (or beamforming), and, as a result, reference signal received power (RSRP) and/or SNR (signal to noise ratio) of the downlink channel may be improved. When the RSRP and/or the SNR of the downlink channel are improved, a rank index (RI) or a channel quality indicator (CQI) for a corresponding electronic device may be increased. The base station 420 may allocate a high rank or modulation and code schemes (MCS) to the electronic device 101 based on the improved performance of the electronic device 101 to improve the downlink throughput of the electronic device 101.

However, even if the electronic device 101 transmits the SRS, there may be cases in which the gain of downlink throughput is not large. For example, when the magnitude of data to be received by the electronic device 101 through the downlink is not large, the gain of downlink throughput may not be large. Alternatively, when the difference between the SRS target power of the electronic device 101 and the maximum transmittable power of the electronic device 101 is large, the gain of downlink throughput may not be large. The electronic device 101 according to various embodiments may not transmit the SRS or may transmit the SRS with a relatively small magnitude when the gain of downlink throughput is not large even though the SRS is transmitted, which will be described later.

According to various embodiments, the base station 420 may use a downlink reference signal for downlink channel estimation. For example, when the base station 420 transmits the downlink reference signal to the electronic device 101, the electronic device 101 may receive the downlink reference signal transmitted from the base station 420 and perform channel estimation. The electronic device 101 may transmit a channel estimation result to the base station 420, and the base station 420 may perform downlink beamforming by referring to the channel estimation result transmitted from the electronic device 101. According to various embodiments, when the base station 420 performs channel estimation by a reference signal (e.g., SRS) transmitted from the electronic device 101, channel estimation may be performed faster than the channel estimation using the downlink reference signal.

According to various embodiments, the first communication network (e.g., base station (gNB)) or the second communication network (e.g., base station (eNB)) may request various configuration information of the electronic device 101 by transmitting a UE capability enquiry message to the electronic device 101. For example, the first communication network (e.g., base station (gNB)) or the second communication network (e.g., base station (eNB)) may request information related to the reception antenna of the electronic device 101 through the UE capability enquiry message. The electronic device 101 may receive the UE capability enquiry message from the first communication network or the second communication network, and transmit a UE capability information message to the first communication network or the second communication network in response thereto. According to various embodiments, the UE capability information message may include information related to the reception antenna of the electronic device 101, such as 'supportedSRS-TxPortSwitch t1r4', corresponding to the content of the UE capability enquiry message.

As information related to the antenna is described as 'supportedSRS-TxPortSwitch t1r4', the first communication network may determine that the electronic device 101 may transmit signals by using four reception antennas, and include and transmit information on a time to transmit reference signals (e.g., SRS) for each of the four antennas in the RRC reconfiguration message.

Figure 5:
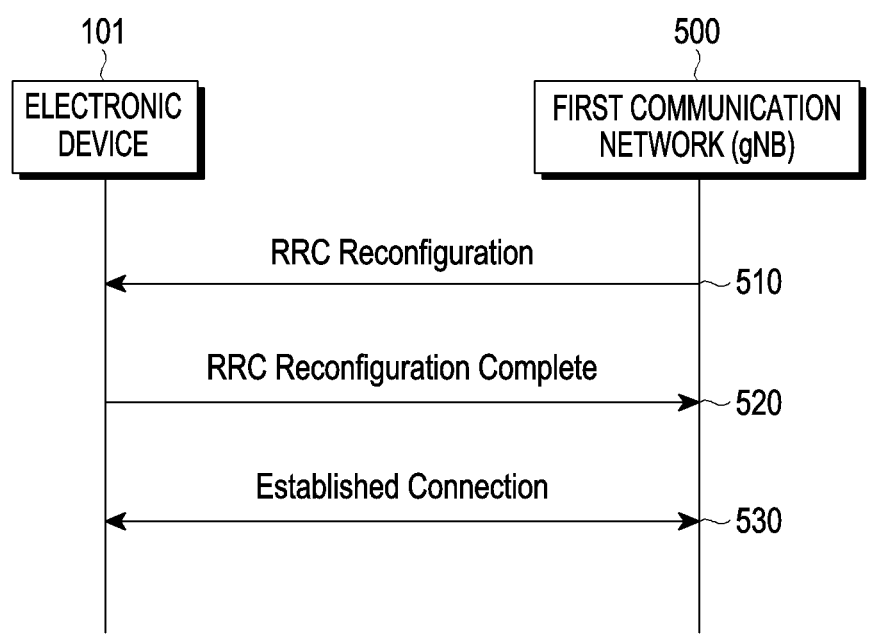
FIG. 5 is a flowchart illustrating a procedure for transmitting and receiving a signal between an example electronic device and a communication network according to various embodiments.

FIG. 5 is a flowchart illustrating a procedure for transmitting and receiving a signal between an example electronic device and a communication network according to various embodiments. Referring to FIG. 5, the electronic device 101 may configure an RRC connection with a first communication network (e.g., base station (gNB)) 500 through a random access channel (RACH) procedure.

According to various embodiments, in operation 510, the first communication network 500 may transmit an RRC reconfiguration message to the electronic device 101. For example, the first communication network 500 may transmit the RRC reconfiguration message in response to an RRC request message transmitted from the electronic device 101. As described above, the RRC reconfiguration message may include information on a time for the electronic device 101 to transmit reference signals (e.g., SRS) for each antenna.

perodicityAndOffset-p s120: 17
perodicityAndOffset-p s120: 7
perodicityAndOffset-p s120: 13
perodicityAndOffset-p s120: 3
nrofSymbols n1

Referring to the RRC reconfiguration message, as described in "nrofSymbols n1.", it may be seen that the duration of transmitting an SRS may be determined by an allocated symbol. In addition, referring to the RRC reconfiguration message, as described in "periodicityAndOffset-p s120: 17", the first SRS is configured to be transmitted in the 17th slot while transmitting once every 20 slots; as described in "periodicityAndOffset-p s120: 7", the second SRS is configured to be transmitted in the 7th slot while transmitting once every 20 slots; as described in "periodicityAndOffset-p s120: 13", the third SRS is configured to be transmitted in the 13th slot while transmitting once every 20 slots; and as described in "periodicityAndOffset-p s120: 3", the fourth SRS is configured to be transmitted in the third slot while being transmitted once every 20 slots.

According to various embodiments, the electronic device 101 may transmit 4 SRSs through each antenna at different times in every 20 slots according to RRC reconfiguration configurations. The magnitude of one slot may be determined by a subcarrier spacing (SCS). For example, when the SCS is 30 KHz, the time interval of one slot may be 0.5 ms, and the time interval of 20 slots may be 10 ms. Accordingly, the electronic device 101 may repeatedly transmit the SRS at different times through each antenna every 10 ms period. According to various embodiments, one slot may include 14 symbols, and assuming that one symbol is allocated for one SRS transmission, it may have a symbol duration (or symbol enable time) of 0.5 ms*$\frac{1}{14}$=35 μs (0.035 ms).

According to various embodiments, in operation 520, the electronic device 101 may transmit an RRC reconfiguration complete message to the first communication network 500. As the RRC reconfiguration procedure is normally completed, in operation 530, the electronic device 101 and the first communication network 500 may complete RRC connection establishment.

According to various embodiments, as described above, the electronic device 101 may transmit reference signals at different times for each configured time period (e.g., 10 ms) through each antenna transmission path based on the information on the transmission time of the reference signal (e.g., SRS) received from the first communication network 500.

Figure 6:
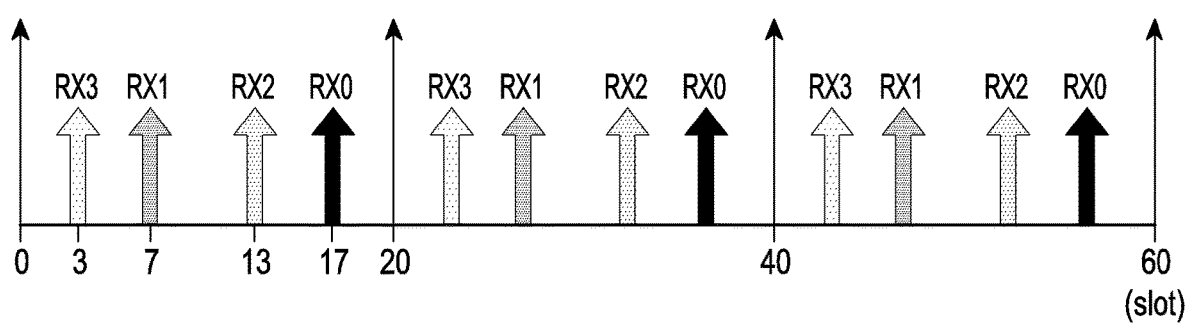
FIG. 6 is a diagram illustrating a transmission period of a reference signal according to various embodiments.

FIG. 6 is a diagram illustrating a transmission period of a reference signal according to various embodiments. Referring to FIG. 6, for example, the electronic device 101 may transmit the first SRS in the 17th slot, transmit the second SRS in the 7th slot, the third SRS in the 13th slot, and the fourth SRS in the 3rd slot among 20 slots every 10 ms. For example, the electronic device 101 may include four reception antennas by supporting 1T4R (e.g., a scenario in which one of four reception antennas is mapped for transmission purposes and transmitted). The electronic device 101 may transmit the SRS signal through each of the four reception antennas (e.g., RX0, RX1, RX2, and RX3 of FIG. 6).

According to various embodiments, the reference signal may be a sounding reference signal (SRS) used for multi-antenna signal processing (e.g., multi-input multi-output (MIMO) or beamforming) through uplink channel state measurement, but is not limited thereto. For example, in the above description or the following description, the SRS is taken as an example of the reference signal, but any type of uplink reference signal (e.g., uplink demodulation reference signal (DM-RS)) transmitted from the electronic device 101 to the base station may be included in the reference signal described later.

Figure 7A:
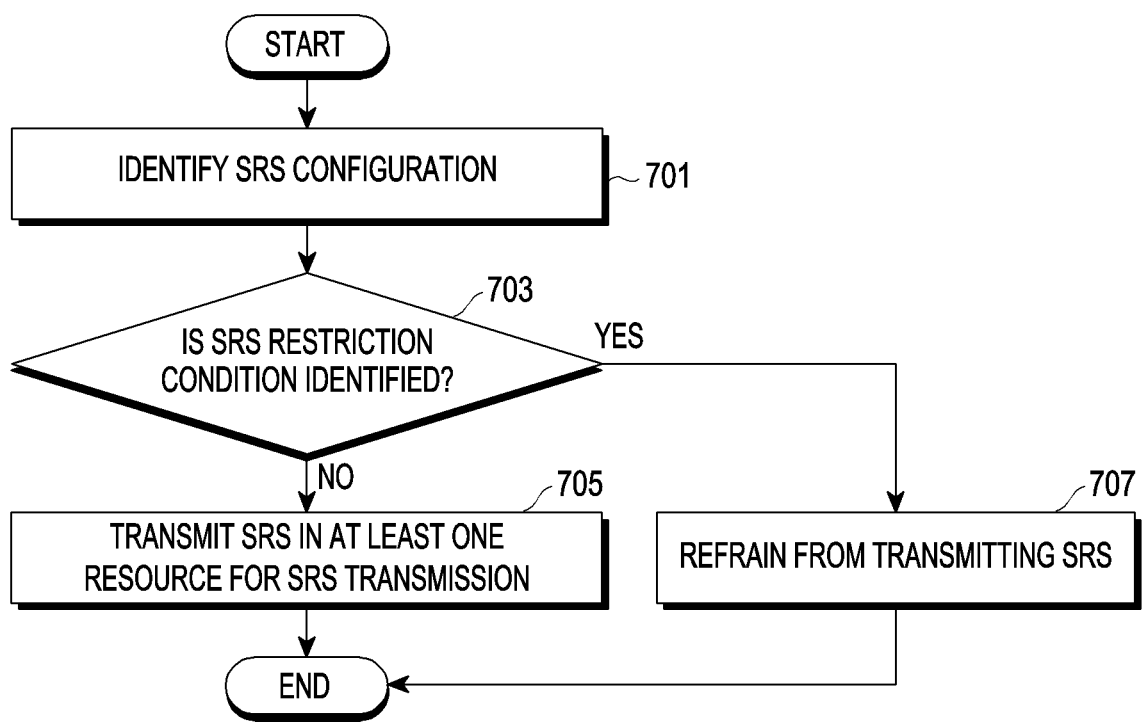
FIG. 7A is a flowchart illustrating an example operating method of an example electronic device according to various embodiments.

FIG. 7A is a flowchart illustrating an operating method of an example electronic device according to various embodiments.

According to various embodiments, in operation 701, the electronic device 101 (e.g., at least one of the processor 120, the first communication processor 212, the second communication processor 214, or the integrated communication processor 260) may identify an SRS configuration received from a network. For example, the electronic device 101 may identify information on a time to transmit the SRS described with reference to FIG. 5 (e.g., perodicityAndOffset-p s120) and information on the duration of transmitting the SRS (e.g., nrofSymbols). As described in relation to FIG. 5, the SRS configuration may be included in the RRC reconfiguration message, but this is merely an example, and the electronic device 101 may also identify the SRS configuration from other messages (e.g., system information block (SIB) 2, RRC connection setup message) received from the network. The electronic device 101 may identify information (e.g., periodic, aperiodic, or semi-persistent) on the SRS resource type. The electronic device 101 may be configured to transmit the SRS based on the identified SRS configuration.

According to various embodiments, in operation 703, the electronic device 101 may determine whether an SRS restriction condition is identified. The SRS restriction condition may be at least one of various conditions for determining a case in which the downlink throughput when transmitting the SRS does not significantly increase compared to the downlink throughput when the SRS is not transmitted. A degree of increase in downlink throughput when transmitting the SRS compared to downlink throughput when not transmitting the SRS may be referred to, for example, as a gain of downlink throughput. On the other hand, the downlink throughput is simply an example parameter, and those skilled in the art will understand that any parameter that may represent the downlink speed and/or quality may be used instead of the downlink throughput.

For one example, when the magnitude of downlink data is relatively small, the gain of downlink throughput may not be large. Considering the trade-off between current consumption and the gain of downlink throughput, when the magnitude (e.g., physical downlink shared channel (PDSCH) scheduling rate) of downlink data is smaller than a threshold value, the electronic device 101 may determine that an SRS restriction condition is identified. For another example, when an SRS target power is considerably greater than the maximum power supported by the electronic device 101, the gain of downlink throughput may not be large. Considering the trade-off between current consumption and the gain of downlink throughput, when the difference between the SRS target power and the maximum power is greater than a threshold value, the electronic device 101 may determine that the SRS restriction condition is identified. In another example, the electronic device 101 may determine whether the SRS restriction condition is identified based on the type of application being executed or various parameters (e.g., ranks, layers, or modulation and code schemes (MCS)) related to downlink. The electronic device 101 may determine whether one or more SRS restriction conditions are identified, and each of the various embodiments described above will be described later.

According to various embodiments, when it is determined that the SRS restriction condition is not identified (703-No), the electronic device 101 may transmit the SRS in at least one resource for SRS transmission in operation 705. The electronic device 101 may transmit the SRS through at least some of the plurality of antennas in each of the at least one resource. For example, it is assumed that the electronic device 101 identifies values of 17, 7, 13, and 3 with perodicityAndOffset-p s120 and identifies n1 with nrofSymbols. The electronic device 101 may transmit the first SRS in the 17th slot while transmitting the same once every 20 slots, transmit the second SRS in the 7th slot while transmitting the same once every 20 slots, transmit the third SRS in the 13th slot while transmitting the same once every 20 slots, and transmit the fourth SRS in the third slot while transmitting the same once every 20 slots. Assuming that one symbol is allocated for one SRS transmission, it may have a symbol duration (or symbol enable time) of 0.5 ms*1/14=35 μs (0.035 ms). When it is determined that the SRS restriction condition is identified (703-Yes), the electronic device 101 may refrain from transmitting the SRS in operation 707. Accordingly, the SRS may not be transmitted from the electronic device 101 to the network in slots (e.g., 17th, 8th, 13th, and 20th slots) configured as SRS transmission time points from the network.

In an example, the electronic device 101 may determine that the SRS restriction condition is not identified while determining that the SRS restriction condition is identified. In this case, the electronic device 101 may transmit the SRS in the configured slot based on the SRS restriction condition identifying failure while refraining from transmitting the SRS. In another example, the electronic device 101 may determine that the SRS restriction condition is identified while determining that the SRS restriction condition is not identified. In this case, the electronic device 101 may refrain from transmitting the SRS based on the confirmation of the SRS restriction condition while transmitting the SRS in the configured slot.

According to various embodiments, the electronic device 101 may refrain from transmitting the SRS based on identifying the SRS restriction condition. In this case, the electronic device 101 may transmit channel state information (CSI) feedback to the network. Even if the SRS is not received from the electronic device 101, the network may receive CSI feedback from the electronic device 101, and, based on this, at least one operation for improving downlink performance may be performed.

Figure 7B:
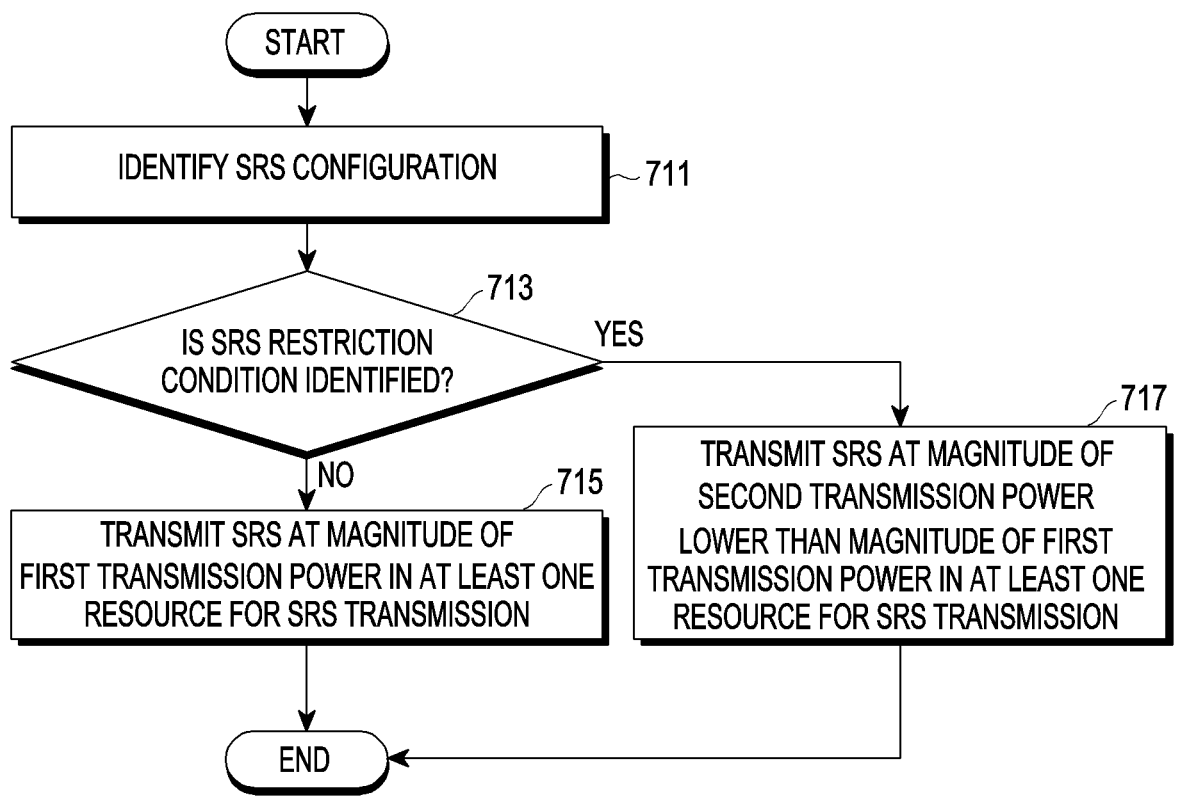
FIG. 7B is a flowchart illustrating an example operating method of an example electronic device according to various embodiments.

FIG. 7B is a flowchart illustrating an operating method of an example electronic device according to various embodiments. Operations 711 and 713 are substantially the same as operations 701 and 703 in FIG. 7A, and description thereof will not be repeated.

According to various embodiments, when it is determined that the SRS restriction condition is not identified (713-No), the electronic device 101 (e.g., at least one of the processor 120, the first communication processor 212, the second communication processor 214, or the integrated communication processor 260) may transmit the SRS with the first transmission power magnitude in at least one resource (e.g., 17th, 8th, 13th, 20th slots) for SRS transmission in operation 715.

According to various embodiments, the electronic device 101 may determine the magnitude of the first transmission power of the SRS based on the SRS target power and/or the maximum power (e.g., UE Tx MAX Power) of the electronic device 101. For example, the electronic device 101 may determine the SRS target power (or SRS output power) based on Equation 1 according to 3GPP technical specification (TS) 38.213.

$$P_{O\text{-}SRS,b,f,c}(q_s) + 10 \log_{10}(2^u \cdot M_{SRS,b,f,c}(i)) + \alpha_{SRS,b,f,c}(q_s) \cdot PL_{b,f,c}(q_d) + h_{b,f,c}(i,l)$$ [Equation 1]

The definition of Equation 1 may follow 3GPP TS 38.213, and for example, $P_{O\text{-}SRS,b,f,c}(q_s)$ may be provided by SRS resource set ($q_s$) provided by SRS-ResourceSet and SRS-ResourceSetID according to SRS configuration, and $P_O$ for the activation uplink bandwidth part (UL BWP) ($_b$) of the carrier ($_f$) of the serving cell ($_c$). $M_{SRS,b,f,c}(i)$ is the SRS bandwidth represented by the number of resource blocks for SRS transmission occasion (i) on the activation UL BWP ($_b$) of the carrier ($_f$) of the serving cell ($_c$), and μ is the SCS. $\alpha_{SRS,b,f,c}(q_s)$ is provided by alpha for the activation UL BWP of the carrier ($_f$) of the SRS resource set ($q_s$) and the serving cell ($_c$). $P_{Lb,f,c}(q_d)$ is a downlink pathloss predicted in units of dB by a user equipment (UE) by using the RS resource index ($q_d$) for the SRS resource set ($q_s$) and the activation downlink BWP (DL BWP) of the serving cell ($_c$). $h_{b,f,c}(i)$ may be $\delta_{SRS,b,f,c}(i)$, the condition may follow 3GPP TS 38.213, and may be a value that may be adjusted by downlink control information (DCI) from the base station.

The maximum power of the electronic device 101 may be determined as the minimum value among the maximum available transmission power (PcMax) of the electronic device 101 considering the characteristics of the electronic device 101, the maximum transmission power (PeMax) according to the power class configured in the electronic device 101, and the maximum transmission power (SAR Max Power) considering specific absorption rate (SAR) backoff event, but the determination method is not limited. In an example, the maximum power for SRS may be configured to be greater than the general UE TX Max Power. Maximum power and tolerance (e.g., ±2 dB or ±23 dB) of the power class may be configured for each NR band. Accordingly, the maximum power for SRS may be configured to be greater than the UE Tx Max Power. For example, when the UE Tx MAX Power is 23 dBm, the maximum power for SRS may be configured to 25.5 dBm. For example, the electronic device 101 may determine the lower value among the SRS target power and the maximum power for SRS as the magnitude of the first transmission power, which is the magnitude of the SRS transmission power when the restriction condition is not identified. The electronic device 101 may transmit the SRS with the first transmission power by controlling a power amplifier installed inside or outside the RH-E. In various embodiments, transmitting the SRS with a specific magnitude may refer, for example, to controlling at least one amplifier in the electronic device 101 so that power (e.g., dBm unit) corresponding to the specific magnitude is provided to the antenna.

According to various embodiments, when it is determined that the SRS restriction condition is identified (713-Yes), the electronic device 101 may transmit the SRS with the second transmission power lower than the first transmission power in at least one resource (e.g., 17th, 8th, 13th, 20th slots) for SRS transmission in operation 717. In an example, the electronic device 101 may store the magnitude of the second transmission power specified in advance, and transmit the SRS with the magnitude of the second transmission power specified in advance as the SRS restriction condition is identified. In another example, the electronic device 101 may store a previously specified back-off magnitude, and identify the magnitude of the second transmission power by subtracting the back-off magnitude from the magnitude of the first transmission power as the SRS restriction condition is identified. In another example, the electronic device 101 may primarily identify the back-off magnitude (e.g., 3 dB) based on the magnitude of the first transmission power, and identify the magnitude of the second transmission power by subtracting the identified back-off magnitude from the magnitude of the first transmission power. For example, as the magnitude of the first transmission power increases, the corresponding back-off magnitude may also increase, but is not limited thereto. In another example, the electronic device 101 may identify the magnitude of the second transmission power by multiplying the magnitude of the first transmission power by a specified ratio (or the ratio determined by the magnitude of the first transmission power), and it will be understood that the above example is merely illustrative, and there is no limitation on the method for identifying the magnitude of the second transmission power. The magnitude of the second transmission power is a smaller value than that of the first transmission power, and may be 0, for example. According to various embodiments, the electronic device 101 may identify the magnitude of the second transmission power by referring to a pre-stored table instead of by calculating the magnitude of the second transmission power. For example, the electronic device 101 may store related information between the magnitude of the first transmission power and the magnitude of the second transmission power as a table, and identify the magnitude of the second transmission power corresponding to the magnitude of the first transmission power by referring to the table.

In an example, the electronic device 101 may simultaneously use two or more radio access technologies (RATs) (e.g., LTE and NR). In this case, the electronic device 101 may store a power restriction condition based on dynamic power sharing (DPS) in advance. Table 1 is an example of power restriction conditions according to the DPS in EN-DC.

TABLE 1

| PLTE(dBm) | 23 | 22 | 21 | 20 | 19 | 18 | 17 |
|---|---|---|---|---|---|---|---|
| Pmax_NR_DPS(dBm) | 17 | 18 | 19 | 20 | 21 | 22 | 23 |

For example, when a magnitude of transmission power of 23 dBm is configured for LTE, the maximum value may be configured to 17 dBm for NR. Depending on the magnitude of transmission power configured for LTE, the maximum value for NR may be different. For example, the electronic device 101 may configure the corresponding back-off magnitude to A when the maximum value of NR is configured to 23 dBm, and configure the corresponding back-off magnitude to B when the maximum value of NR is configured to 17 dBm, and A may be greater than B. In an example, the electronic device 101 may determine that the SRS restriction condition is not identified while determining that the SRS restriction condition is identified. In this case, the electronic device 101 may transmit the SRS with the first transmission power magnitude based on the SRS restriction condition identifying failure while transmitting the SRS with the second transmission power magnitude. In another example, the electronic device 101 may determine that the SRS restriction condition is identified while determining that the SRS restriction condition is not identified. In this case, the electronic device 101 may transmit the SRS with the second transmission power magnitude based on the SRS restriction condition identifying while transmitting the SRS with the first transmission power magnitude.

Figure 8:
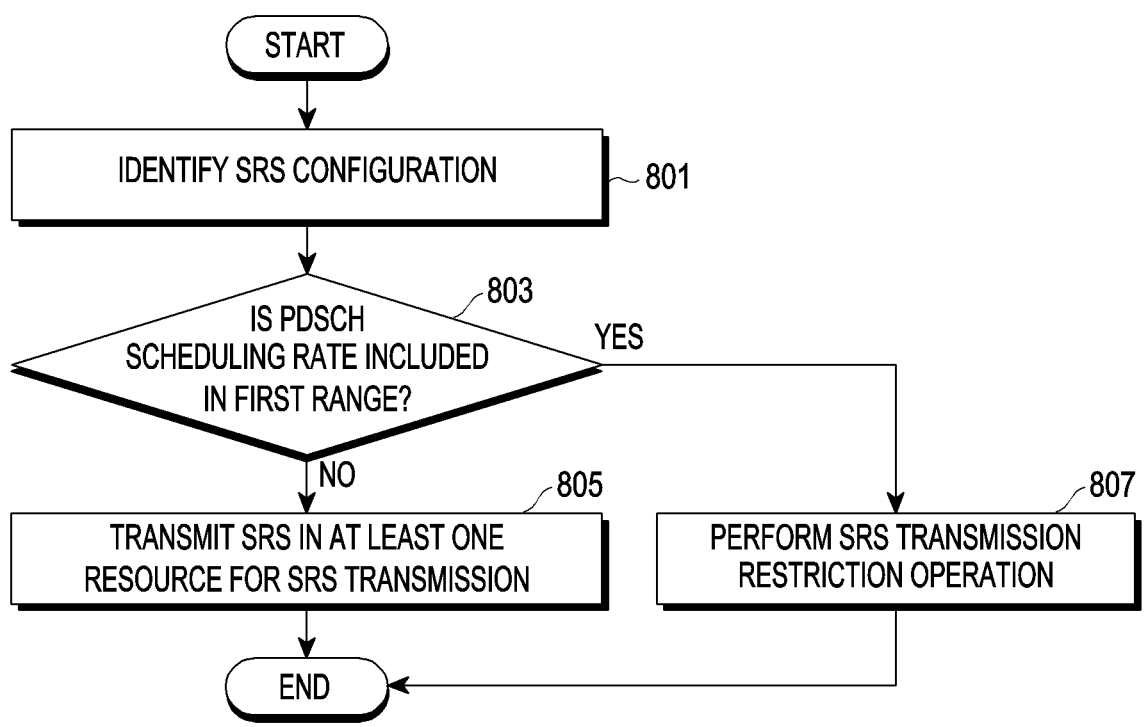
FIG. 8 is a flowchart illustrating an example operating method of an example electronic device according to various embodiments.

FIG. 8 is a flowchart illustrating an operating method of an example electronic device according to various embodiments.

According to various embodiments, in operation 801, the electronic device 101 (e.g., at least one of the processor 120, the first communication processor 212, the second communication processor 214, or the integrated communication processor 260) may identify an SRS configuration. The electronic device 101, in operation 803, may determine whether the PDSCH scheduling rate is included in the first range. The electronic device 101 may identify the scheduling rate of the PDSCH based on whether each slot of the PDSCH is scheduled. For example, the electronic device 101 may identify the ratio of scheduled slots among total slots of PDSCHs for a pre-specified period (e.g., 100 ms or 1 s) as the PDSCH scheduling rate, and accordingly, the ratio of scheduled slots may be expressed as a value of 0 to 1 or a percentage (%). For example, when there are 100 reception opportunities during a specified period of 100 ms, the electronic device 101 may count how many times data reception was performed among the reception opportunities and identify the ratio. The base station may transmit data in a specific number of opportunities during a specified period, and the ratio of opportunities for which transmission is performed to all opportunities may be a value equal to the PDSCH scheduling rate. If data reception is performed 30 times, the PDSCH scheduling rate may be 30%. The first range may be a range of PDSCH scheduling rates in which the gain of downlink throughput is relatively low. The first range may be, for example, a range in which the PDSCH scheduling rate is equal to or less than the first threshold value (e.g., 30%). The PDSCH scheduling rate may be referred to, for example, as a downlink scheduling ratio, and it will be understood that the PDSCH scheduling rate may be used interchangeably with the downlink scheduling ratio, as long as the parameter may indicate the magnitude of downlink data.

According to various embodiments, when the PDSCH scheduling rate is not included in the first range (803-No), the electronic device 101 may transmit the SRS with the first transmission power magnitude in at least one resource for SRS transmission in operation 805. When the PDSCH scheduling rate is included in the first range (803-Yes), the electronic device 101 may perform the SRS transmission restriction operation in operation 807. The SRS transmission restriction operation may be, for example, refraining from transmitting the SRS in FIG. 7A or transmitting the SRS with the magnitude of the second transmission power in FIG. 7B. The electronic device 101 may be preconfigured to perform either refraining from transmitting the SRS or transmitting the SRS with the magnitude of the second transmission power. Alternatively, the electronic device 101 may be configured to select either refraining from transmitting the SRS or transmitting the SRS with the magnitude of the second transmission power when the SRS restriction condition is identified.

In another example, the electronic device 101 may divide the range of PDSCH scheduling rates into three ranges (e.g., a first range, a second range, and a third range). For example, when the PDSCH scheduling rate is included in the first range, the electronic device 101 may transmit the SRS with the first transmission power magnitude based on a method for identifying the transmission power magnitude of the general SRS. For example, when the PDSCH scheduling rate is included in the second range, the electronic device

101 may transmit the SRS with the second transmission power magnitude smaller than the first transmission power magnitude. For example, when the PDSCH scheduling rate is included in the third range, the electronic device 101 may not transmit the SRS.

According to various embodiments, the electronic device 101 may operate such that the execution of the SRS transmission restriction operation and the interruption of the SRS transmission restriction operation have hysteresis characteristics. For example, while the SRS transmission restriction operation is not performed, the electronic device 101 may start performing the SRS transmission restriction operation when the PDSCH scheduling rate is equal to or less than a first threshold value (e.g., 30%). While the SRS transmission restriction operation is performed, the electronic device 101 may stop the SRS transmission restriction operation when the PDSCH scheduling rate is higher than the second threshold (e.g., 70%) that is greater than the first threshold (e.g., 30%). The first threshold and the second threshold are not limited. In an embodiment, the electronic device 101 may be configured to perform the SRS transmission restriction operation when the value is less than one single threshold, and to stop the SRS transmission restriction operation when the value exceeds a single threshold.

Figure 9:
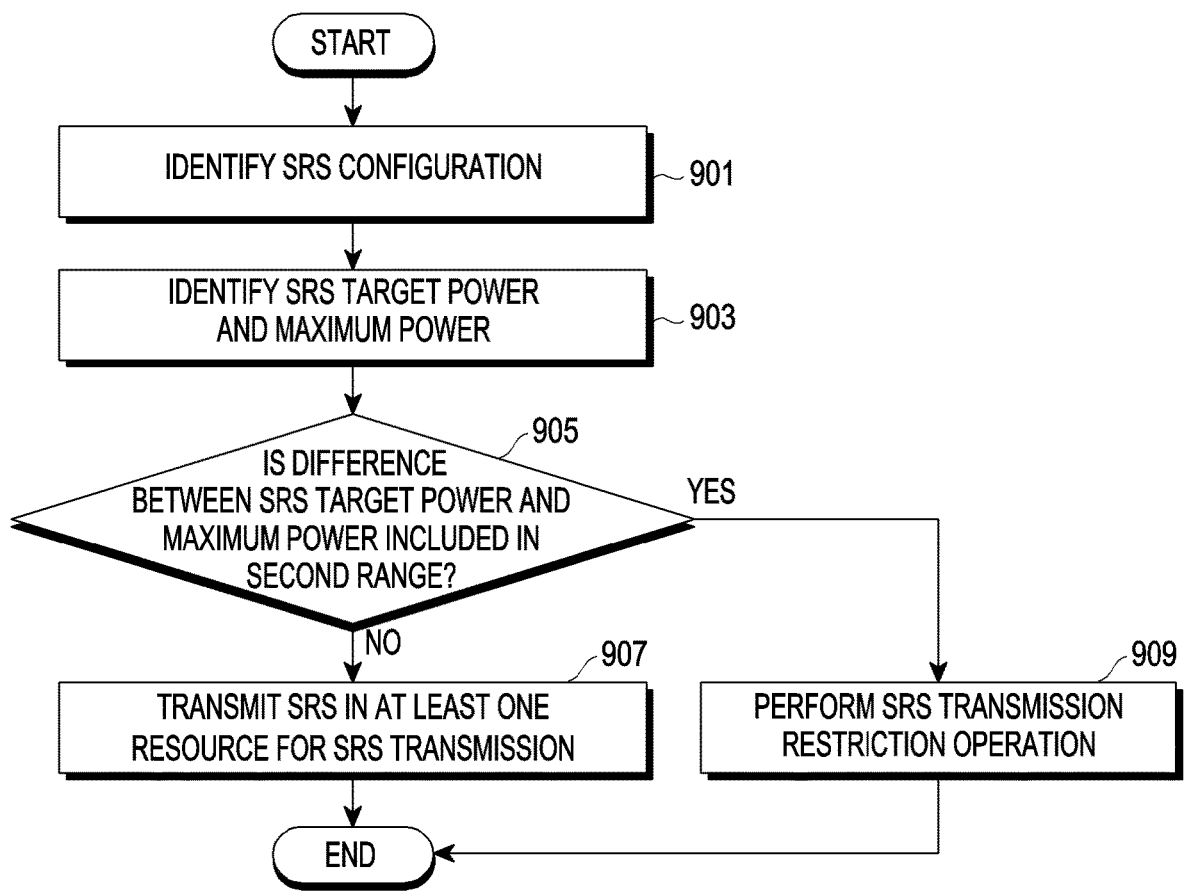
FIG. 9 is a flowchart illustrating an example operating method of an example electronic device according to various embodiments.

FIG. 9 is a flowchart illustrating an operating method of an example electronic device according to various embodiments.

According to various embodiments, in operation 901, the electronic device 101 (e.g., at least one of the processor 120, the first communication processor 212, the second communication processor 214, or the integrated communication processor 260) may identify an SRS configuration. The electronic device 101, in operation 903, may identify an SRS target power and maximum power.

According to various embodiments, the electronic device 101 may determine whether the difference between the SRS target power and the maximum power is included in the second range in operation 905. Table 2 illustrates the measured results (downlink throughput, RB ratio, grant ratio, downlink BLER, effective spectral efficiency) for each difference between the SRS target power and the maximum power.

TABLE 2

| SRS target power – maximum power | Downlink through-put(Mbps) | RB ratio(%) | Grant Ratio(%) Maximum value: 80 | Downlink BLER(%) | Effective Spectral Efficiency |
|---|---|---|---|---|---|
| 0 dB | 985.7 | 97 | 75.5 | 9.4 | 26.1 |
| 2 dB | 948 | 97 | 77.1 | 12.1 | 23.7 |
| 4 dB | 906.9 | 97 | 75.3 | 12.3 | 24.2 |
| 6 dB | 848.7 | 96 | 74.4 | 13.9 | 23 |
| 8 dB | 837.5 | 96 | 72.7 | 13.4 | 23.3 |
| 10 dB | 790 | 97 | 74.6 | 13.9 | 20.7 |
| Not performing SRS transmission | 746.4 | 96.4 | 77.6 | 12.9 | 21.1 |

For example, when the SRS target power is 25 dBm and the max power is 19 dBm, the difference is 6 dB, and in this case, the downlink throughput of 848.7 Mbps, the RB ratio of 96%, the grant ratio of 74.4%, the downlink BLER of 13.9, and the effective spectral efficiency of 23 may be measured and calculated. When the electronic device 101 is located in a relatively weak electric field, the difference between the SRS target power and the maximum power may be relatively large, and when the electronic device 101 is located in a relatively strong electric field, the difference between the SRS target power and the maximum power may be relatively small. As identified in Table 2, as the difference between the SRS target power and the maximum power increases, the downlink throughput decreases, the RB ratio decreases, the grant ratio decreases, and the downlink BLER increases. However, in an actual measurement environment, there may be variables (e.g., time resource allocation and/or frequency resource allocation) generated while several users operate with a corresponding base station, and a value excluding the influence of the variable may be effective spectral efficiency. The effective spectral efficiency may, for example, be downlink throughput obtained when the electronic device 101 is allocated fixed time resource and/or frequency resource. It may be seen that the effective spectral efficiency decreases as the difference between the SRS target power and the maximum power increases. In particular, it may be identified that the effective spectral efficiency when the difference between the SRS target power and the maximum power is 10 dB is smaller than the effective spectral efficiency when SRS transmission is not performed. As identified in Table 2, when the difference between the SRS target power and the maximum power is relatively large, the downlink throughput gain may be small, and accordingly, the electronic device 101 according to various embodiments may be configured to perform the SRS transmission restriction operation based on the difference between the SRS target power and the maximum power. The second range for the difference between the SRS target power and the maximum power may be configured considering the trade-off between the gain of downlink throughput and the current consumption. The second range may represent, for example, a range in which the difference between the SRS target power and the maximum power is greater than or equal to a threshold value, but is not limited thereto. According to various embodiments, when the difference between the SRS target power and the maximum power is not included in the second range (905-No), the electronic device 101 transmit the SRS in at least one resource for SRS transmission in operation 907. When the difference between the SRS target power and the maximum power is included in the second range (905-Yes), the electronic device 101 may perform the SRS transmission restriction operation in operation 909. The SRS transmission restriction operation may be, for example, refraining from transmitting the SRS in FIG. 7A or transmitting the SRS with the magnitude of the second transmission power in FIG. 7B. The electronic device 101 may be preconfigured to perform either refraining from transmitting the SRS or transmitting the SRS with the magnitude of the second transmission power. Alternatively, the electronic device 101 may be configured to select either refraining from transmitting the SRS or transmitting the SRS with the magnitude of the second transmission power when the SRS restriction condition is identified.

In another example, the electronic device 101 may divide the range of the difference between the SRS target power and the maximum power into three ranges (e.g., a first range, a second range, and a third range). For example, when the difference between the SRS target power and the maximum power is included in the first range, the electronic device 101 may transmit the SRS with the first transmission power magnitude based on a method for identifying the transmission power magnitude of the general SRS. For example, when the difference between the SRS target power and the maximum power is included in the second range, the electronic device 101 may transmit the SRS with the second transmission power magnitude smaller than the first transmission power magnitude. For example, when the difference between the SRS target power and the maximum power is included in the third range, the electronic device 101 may not transmit the SRS.

According to various embodiments, the electronic device 101 may determine whether to perform the SRS transmission restriction operation based on the SRS target power rather than the difference between the SRS target power and the maximum power. For example, the maximum power (e.g., UE Tx Max Power or SRS maximum power) may be a variable value or implemented as a fixed value. When the maximum power is a variable value, the electronic device 101 may determine whether to perform the SRS transmission restriction operation based on the difference between the SRS target power and the maximum power, as described with reference to FIG. 9. If the maximum power is a fixed value, the electronic device 101 may be configured to perform the SRS transmission restriction operation when the SRS target power is greater than or equal to a threshold value, and to perform SRS transmission normally when the SRS target power is less than the threshold value. In another example, even if the maximum power is a variable value depending on the implementation, the electronic device 101 may be configured to perform the SRS transmission restriction operation based on the SRS target power without considering the maximum power. In another example, the electronic device 101 may divide the range of the SRS target power into three ranges (e.g., a first range, a second range, and a third range). For example, when the range of the SRS target power is included in the first range, the electronic device 101 may transmit the SRS with the first transmission power magnitude based on a method for identifying the transmission power magnitude of the general SRS. For example, when the range of the SRS target power is included in the second range, the electronic device 101 may transmit the SRS with the second transmission power magnitude smaller than the first transmission power magnitude. For example, when the range of the SRS target power is included in the third range, the electronic device 101 may not transmit the SRS.

According to various embodiments, the electronic device 101 may be configured to perform the SRS restriction operation when both the first condition in which the PDSCH scheduling rate in operation 803 of FIG. 8 is included in the first range and the second condition in which the difference between the SRS target power and the maximum power in operation 905 of FIG. 9 is included in the second range are satisfied. The order of determining whether the first condition and the second condition are satisfied is not limited, and may be performed at least simultaneously.

Figure 10:
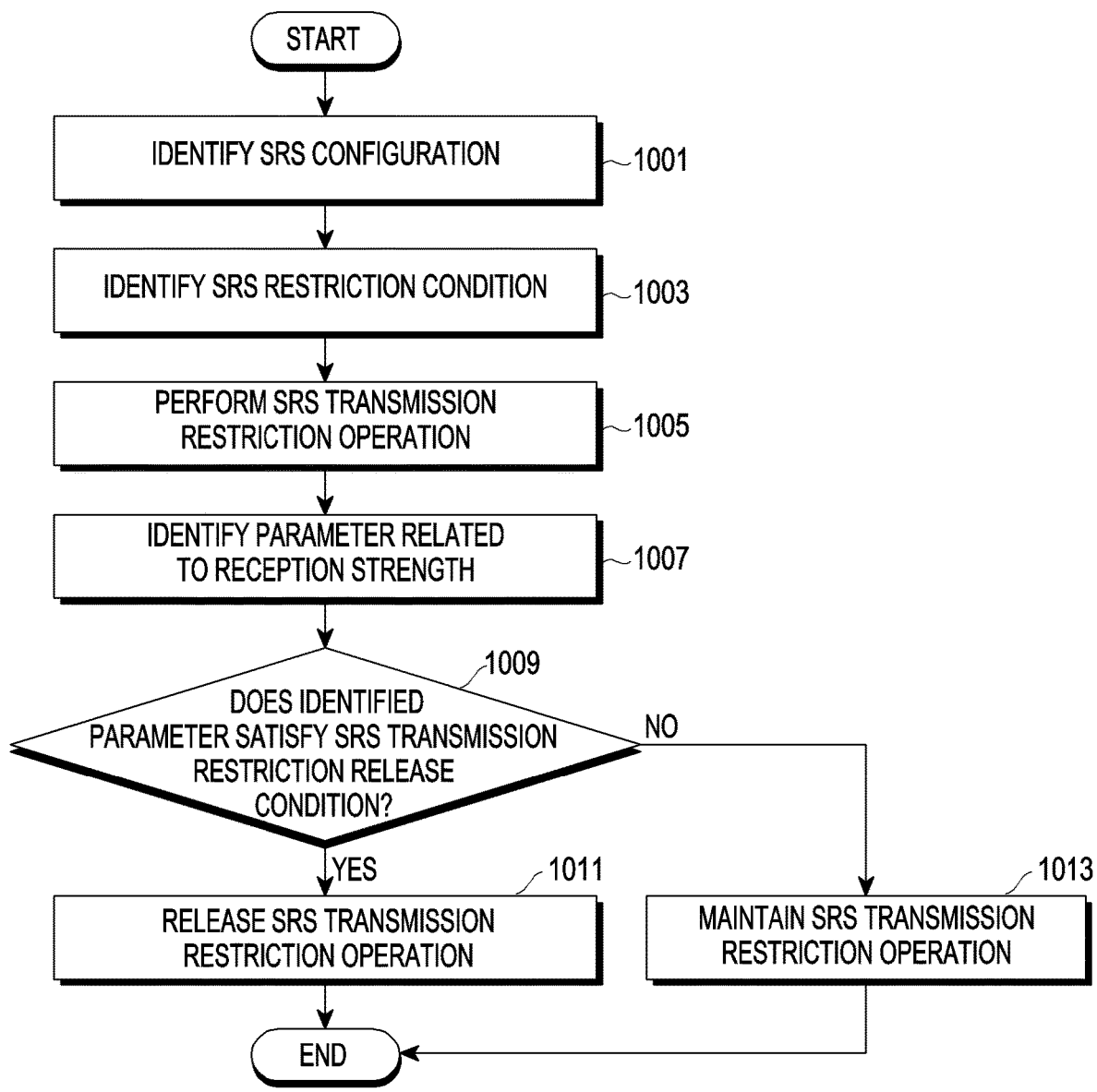
FIG. 10 is a flowchart illustrating an example operating method of an example electronic device according to various embodiments.

FIG. 10 is a flowchart illustrating an operating method of an example electronic device according to various embodiments.

According to various embodiments, in operation 1001, the electronic device 101 (e.g., at least one of the processor 120, the first communication processor 212, the second communication processor 214, or the integrated communication processor 260) may identify an SRS configuration. The electronic device 101, in operation 1003, may identify an SRS restriction condition. As described above, the SRS restriction condition is not limited as long as it is a condition that may determine an environment in which the gain of downlink throughput is not large. In operation 1005, the electronic device 101 may perform an SRS transmission restriction operation. For example, the electronic device 101 may not perform SRS transmission or may transmit the SRS with a transmission power magnitude (e.g., the second transmission power magnitude) smaller than normal SRS transmission power magnitude (e.g., the first transmission power magnitude).

As described above, a network (e.g., base station) may perform at least one operation (e.g., beamforming, scheduling, and/or MCS determination) related to a downlink channel of the electronic device 101 based on the SRS from the electronic device 101. If the electronic device 101 does not perform SRS transmission or performs SRS transmission with restricted transmission power, the network may not be notified that the SRS transmission restriction operation is performed. Because the network has not obtained information on the SRS transmission restriction operation being performed, there is a possibility of performing an erroneous operation accordingly, and there is a possibility that the downlink throughput due to the erroneous operation is reduced. Accordingly, the electronic device 101 may be configured to determine whether to perform SRS transmission while performing the SRS transmission restriction operation. According to various embodiments, in operation 1007, the electronic device 101 may identify a parameter related to downlink reception strength. For example, the electronic device 101 may identify at least one of a signal to noise ratio (SINR), a reference signal received power (RSRP), a received signal strength indicator (RSSI), a reference signal received quality (RSRQ), or a downlink BLER rate, but there is no limitation as long as the parameter is related to reception strength.

According to various embodiments, in operation 1009, the electronic device 101 may determine whether the identified parameter satisfies an SRS transmission restriction release condition. When the SRS transmission restriction release condition is satisfied (1009-Yes), the electronic device 101 may release the SRS transmission restriction operation in operation 1011. When the SRS transmission restriction release condition is not satisfied (1009-No), the electronic device 101 may maintain the SRS transmission restriction operation in operation 1013. In an example, the electronic device 101 may compare a parameter identified while performing the SRS transmission restriction operation with a parameter identified while not performing the SRS transmission restriction operation. The electronic device 101 may determine whether to maintain or release the SRS transmission restriction operation based on the comparison result.

In an example, the electronic device 101 may identify the difference between a first RSSI identified while performing the SRS transmission restriction operation and a second RSSI identified while not performing the SRS transmission restriction operation. When the difference between the first RSSI and the second RSSI is greater than or equal to a threshold RSSI, the electronic device 101 may determine that the SRS transmission restriction release condition is satisfied. The electronic device 101 may determine whether the SRS transmission restriction release condition is satisfied based on not only the RSSI but also the above-described various parameters or a combination of two or more of these parameters. The electronic device 101 may use the corresponding data when there is data in a case in which the SRS transmission restriction operation is not performed. If there is no data when the SRS transmission restriction operation is not performed, the electronic device 101 may be configured to obtain the corresponding data by temporarily performing the SRS.

In another example, the electronic device 101 may compare the RS SI identified while performing the SRS transmission restriction operation with a reference value for comparison, and may determine whether to release/maintain the SSR transmission restriction operation based on the comparison result. The electronic device 101 may determine whether the SRS transmission restriction release condition is satisfied based on not only the RSSI but also the above-described various parameters or a combination of two or more of these parameters.

Figure 11:
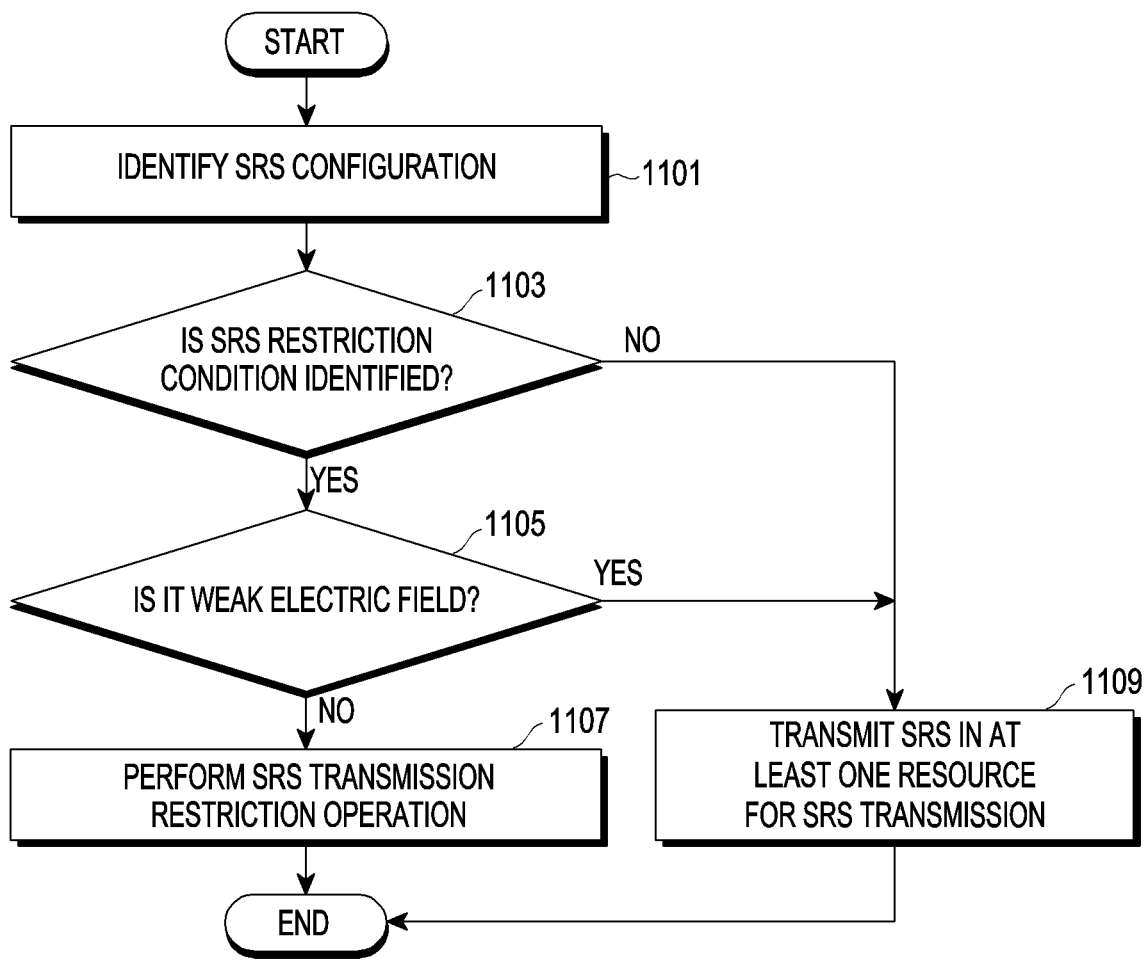
FIG. 11 is a flowchart illustrating an example operating method of an example electronic device according to various embodiments.

FIG. 11 is a flowchart illustrating an operating method of an example electronic device according to various embodiments.

According to various embodiments, in operation 1101, the electronic device 101 (e.g., at least one of the processor 120, the first communication processor 212, the second communication processor 214, or the integrated communication processor 260) may identify an SRS configuration. In operation 1103, the electronic device 101 may determine whether an SRS restriction condition is identified. As described above, the SRS restriction condition is not limited as long as it is a condition that may determine an environment in which the gain of downlink throughput is not large. When the SRS restriction condition is not identified (1103-No), in operation 1109, the electronic device 101 may transmit the SRS with the identified transmission power magnitude (e.g., the first transmission power magnitude) in a normal state in at least one resource for SRS transmission.

According to various embodiments, when the SRS restriction condition is identified (1103-Yes), the electronic device 101 may determine whether the electronic device 101 is currently located in a weak electric field in operation 1105. The electronic device 101 may identify at least one parameter (e.g., at least one of SINR, RSRP, RSSI, RSRQ or downlink BLER rate) related to the reception strength, and determine whether the electronic device 101 is currently located in a weak electric field based on the identified parameter. If it is determined that the electronic device is located in a weak electric field (1105-Yes), the electronic device 101, in operation 1109, may transmit the SRS with the identified transmission power magnitude (e.g., the first transmission power magnitude) in at least one resource for SRS transmission in a normal state. If it is determined that the electronic device is not located in a weak electric field (1105-No), the electronic device 101 may perform the SRS transmission restriction operation in operation 1107. For example, the electronic device 101 may not perform SRS transmission or may transmit the SRS at magnitude of a transmission power (e.g., the magnitude of the second transmission power) smaller than normal SRS transmission power magnitude (e.g., the magnitude of the first transmission power). Accordingly, when the electronic device 101 is located in a weak electric field, the SRS transmission restriction operation may not be performed.

Figure 12:
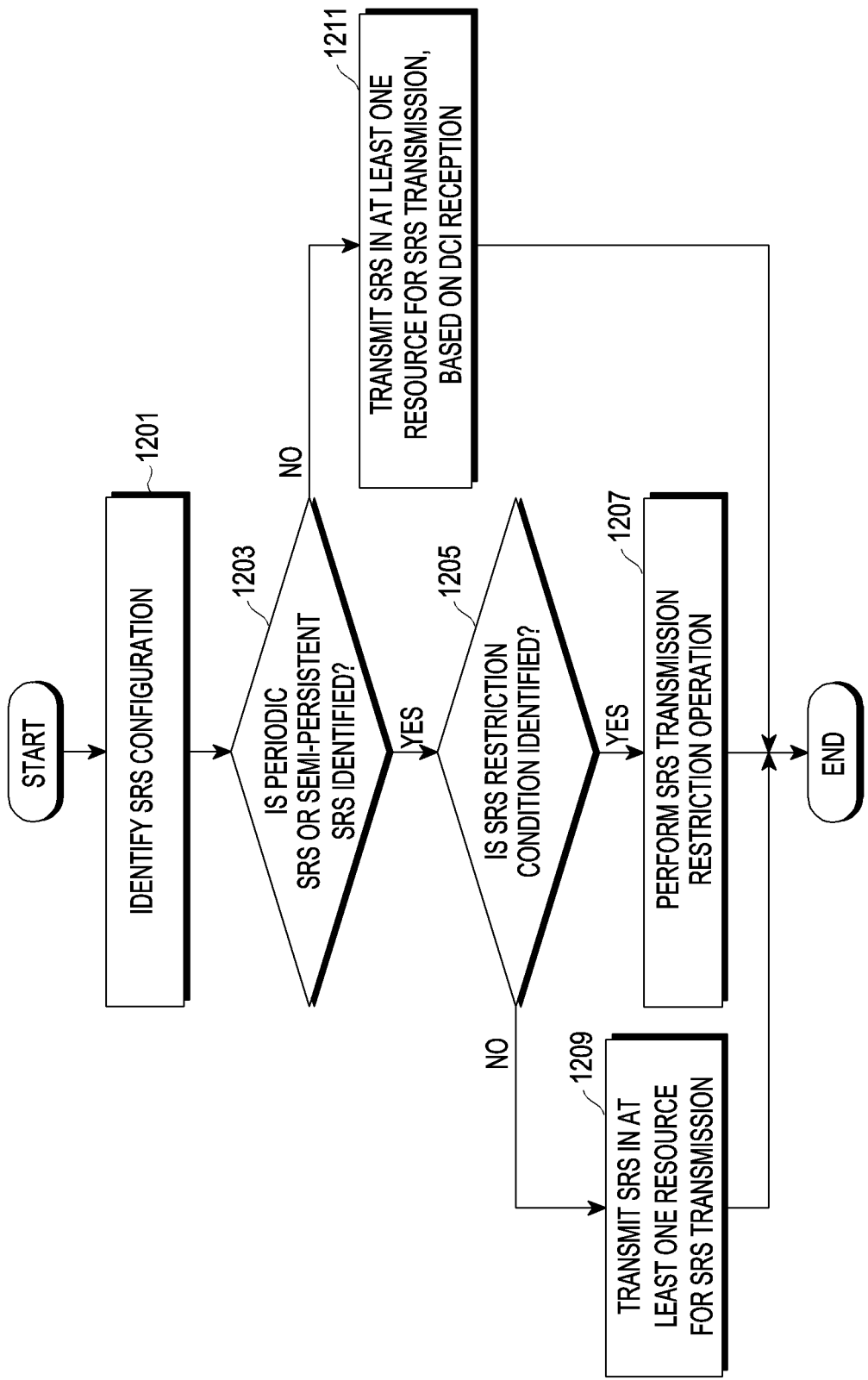
FIG. 12 is a flowchart illustrating an example operating method of an example electronic device according to various embodiments.

FIG. 12 is a flowchart illustrating an operating method of an example electronic device according to various embodiments.

According to various embodiments, in operation 1201, the electronic device 101 (e.g., at least one of the processor 120, the first communication processor 212, the second communication processor 214, or the integrated communication processor 260) may identify an SRS configuration. In operation 1203, the electronic device 101 may determine whether a periodic SRS type or a semi-persistent SRS type is identified. When the electronic device 101 identifies the type of aperiodic SRS (1203-No), the electronic device 101 may transmit the SRS in at least one resource for SRS transmission based on reception of downlink control information (DCI) in operation 1211. When the aperiodic SRS type is identified, the electronic device 101 may determine whether to perform the SRS transmission restriction operation and/or may not perform the SRS transmission restriction operation.

According to various embodiments, when the periodic SRS type or the semi-persistent SRS type is identified (1203-Yes), the electronic device 101 may determine whether an SRS restriction condition is identified in operation 1205. As described above, the SRS restriction condition is not limited as long as it is a condition that may determine an environment in which the gain of downlink throughput is not large. When the SRS restriction condition is not identified (1205-No), in operation 1209, the electronic device 101 may transmit the SRS at the magnitude of the identified transmission power (e.g., the magnitude of the first transmission power) in at least one resource for SRS transmission in a normal state. When the SRS restriction condition is not identified (1205-Yes), the electronic device 101 may perform the SRS transmission restriction operation in operation 1207. As described above, the electronic device 101 may perform the SRS transmission restriction operation when it is identified as the periodic SRS type or the semi-persistent SRS type.

Figure 13:
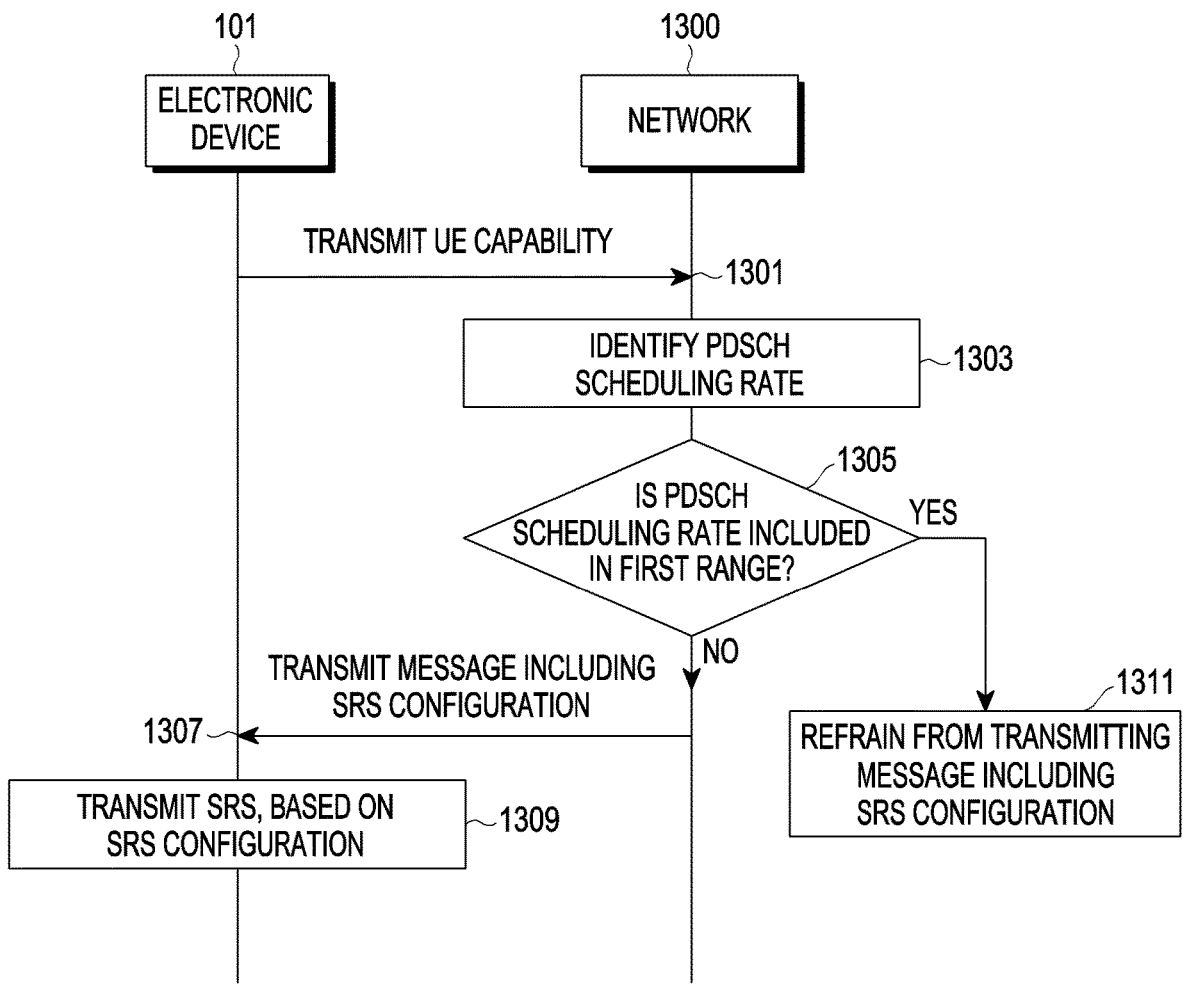
FIG. 13 is a flowchart illustrating an example operating method of an example electronic device according to various embodiments.

FIG. 13 is a flowchart illustrating an operating method of an example electronic device and a network according to various embodiments.

According to various embodiments, in operation 1301, the electronic device 101 (e.g., at least one of the processor 120, the first communication processor 212, the second communication processor 214, or the integrated communication processor 260) may transmit a UE capability to a network 1300 (e.g., a base station and/or a core network). The UE capability may include information on srs-TxSwitch (e.g., supportedSRS-TxPortSwitch: t1r4, t1r2, t2r4). The network 1300 may identify the SRS configuration corresponding to the electronic device 101 based on the received UE capability. In operation 1303, the network 1300 may identify the PDSCH scheduling rate corresponding to the electronic device 101. The network 1300 may identify the ratio of scheduled slots among total slots of PDSCHs allocated to the electronic device 101 for a pre-specified period as the PDSCH scheduling rate, and accordingly, the ratio of scheduled slots may be expressed as a value of 0 to 1 or a percentage (%). In operation 1305, the network 1300 may determine whether the PDSCH scheduling rate corresponding to the electronic device 101 is included in a first range. The first range may be a range of PDSCH scheduling rates in which the gain of downlink throughput is relatively low. The first range may be, for example, a range in which the PDSCH scheduling rate for a specific electronic device is equal to or less than a first threshold value (e.g., 30%).

According to various embodiments, when the PDSCH scheduling rate corresponding to the electronic device 101 is not included in the first range (1305-No), the network 1300 may transmit a message including SRS configuration to the electronic device 101 in operation 1307. For example, the network 1300 may include SRS configuration in an RRC reconfiguration message, an SIB 2, or an RRC connection setup message and transmit the same to the electronic device 101. In operation 1309, the electronic device 101 may transmit the SRS to the network 1300 based on the SRS configuration. When the PDSCH scheduling rate corresponding to the electronic device 101 is included in the first range (1305-Yes), the network 1300 may refrain from transmitting a message including SRS configuration in operation 1311. For example, the network 1300 may transmit the RRC reconfiguration message, the SIB 2, or the RRC connection setup message to the electronic device 101, but the SRS configuration may not be included in the RRC reconfiguration message, the SIB 2, or the RRC connection setup message. Because the SRS configuration has not been received, the electronic device 101 may not perform SRS.

Figure 14:
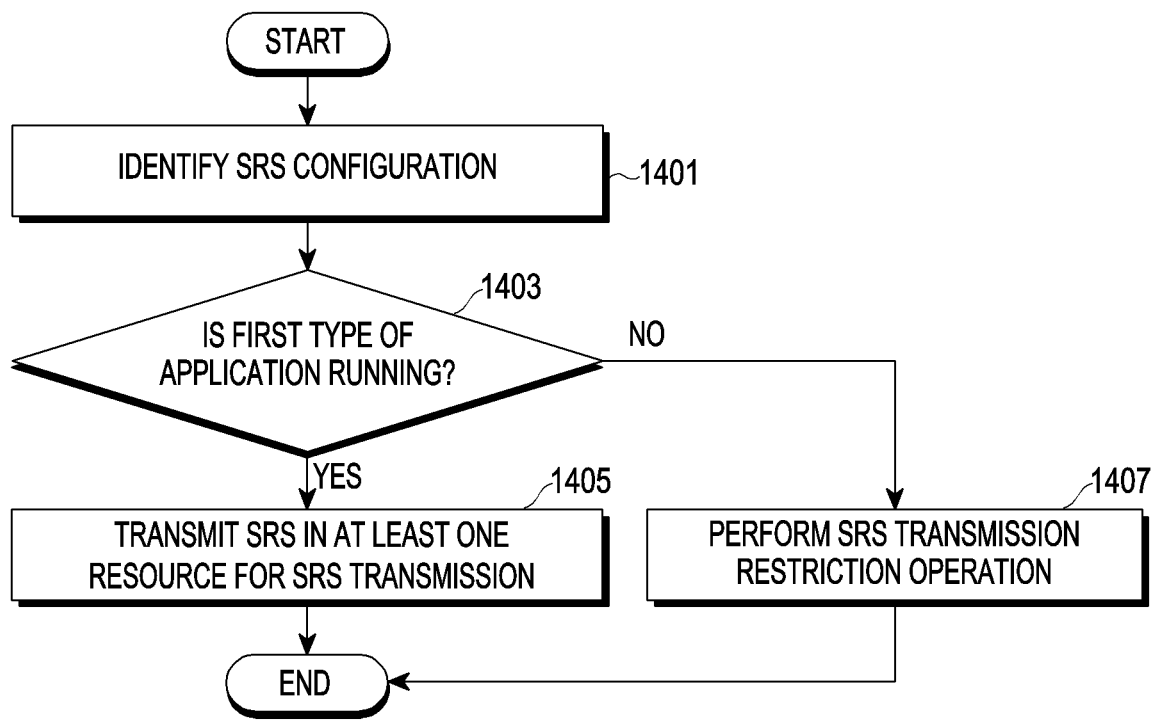
FIG. 14 is a flowchart illustrating an example operating method of an example electronic device according to various embodiments.

FIG. 14 is a flowchart illustrating an operating method of an example electronic device according to various embodiments.

According to various embodiments, in operation 1401, the electronic device 101 (e.g., at least one of the processor 120, the first communication processor 212, the second communication processor 214, or the integrated communication processor 260) may identify an SRS configuration. In operation 1403, the electronic device 101 may determine whether a first type of application is running. The first type of application may be, for example, an application (e.g., a web browsing application, a video streaming application) using a relatively large magnitude of downlink data. When an application using a relatively large magnitude of downlink data is running, there is a high possibility that the PDSCH scheduling rate is high. Accordingly, when the first type of application is running, transmission of the SRS is highly likely to increase downlink throughput gain. When the first type of application is not running, a downlink throughput gain according to SRS transmission may not be large. For example, at least one of the communication processors (e.g., the first communication processor 212, the second communication processor 214, or the integrated communication processor 260) may receive, from the processor 120 (e.g., an application processor), whether a specific application is running, and based on this, determine whether to perform the SRS transmission restriction operation. Alternatively, the communication processor may directly receive information indicating whether the SRS transmission restriction operation is performed from the processor 120. The electronic device 101 may manage the first type of application configured not to perform the SRS transmission restriction operation as a type or as an application identifier. When the first type of application is running (1403-Yes), the electronic device 101 may transmit the SRS in at least one resource for SRS transmission in operation 1405. When the first type of application is not running (1403-No), the electronic device 101 may perform the SRS transmission restriction operation in operation 1407.

According to various embodiments, the electronic device 101 may determine whether to perform the SRS transmission restriction operation based on the type of network slice being used. For example, when receiving network slice selection assistance information (NSSAI) of the first type from the network, the electronic device 101 may not perform an SRS restriction operation, and may perform an SRS restriction operation when receiving an NSSAI other than the first type. For example, the first type of NSSAI may be information indicating eMBB. In the case of using a network slice for relatively large-capacity data processing, there is a high possibility that the PDSCH scheduling rate is high. Accordingly, when the first type of NSSAI is received, transmission of the SRS is highly likely to increase the gain of downlink throughput. When NSSAIs other than the first type are received, the gain of downlink throughput according to SRS transmission may not be large. Accordingly, the electronic device 101 may determine whether to perform the SRS transmission restriction operation based on the NSSAI.

According to various example embodiments, an electronic device may include a plurality of antennas and at least one processor (e.g., at least one of the processor 120, the first communication processor 212, the second communication processor 214, or the integrated communication processor 260), wherein the at least one processor may be configured to identify a sounding reference signal (SRS) configuration received from a network, identify a physical downlink shared channel (PDSCH) scheduling rate corresponding to the electronic device, transmit, based on the PDSCH scheduling rate not being included in a first range, at least one SRS at a magnitude of first transmission power through each of at least one of the plurality of antennas, in each of at least one resource for SRS signal transmission identified based on the SRS configuration, and refrain from transmitting the at least one SRS in the at least one resource, or transmit the at least one SRS at a magnitude of second transmission power, through at least one of the plurality of antennas, in the at least one resource, respectively, based on the PDSCH scheduling rate being included in the first range, wherein the magnitude of the second transmission power is different from the magnitude of the first transmission power. The SRS configuration may be configured by the network corresponding to the plurality of antennas. The PDSCH scheduling rate may be a ratio of scheduled slots among total slots of the PDSCH corresponding to the electronic device for a specified period.

According to various example embodiments, as at least a part of the transmitting the at least one SRS at the magnitude of the second transmission power based on the PDSCH scheduling rate being included in the first range, the at least one processor may be configured to determine a magnitude of pre-specified transmission power as the magnitude of the second transmission power, determine a magnitude of transmission power, obtained by backing off a first value from the magnitude of the first transmission power, as the magnitude of the second transmission power, or determine a magnitude of transmission power, obtained by multiplying the magnitude of the first transmission power by a second value, as the magnitude of the second transmission power.

According to various example embodiments, as at least a part of the determining the magnitude of the transmission power, obtained by backing off a first value from the magnitude of the first transmission power, as the magnitude of the second transmission power, the at least one processor may be configured to determine the magnitude of the second transmission power by subtracting the first value, which is a specified back-off value, from the magnitude of the first transmission power, or determine the magnitude of the second transmission power by subtracting the first value, which is identified based on the magnitude of the first transmission power from the magnitude of the first transmission power.

According to various example embodiments, as at least a part of the refraining from transmitting the at least one SRS in the at least one resource, or the transmitting the at least one SRS at the magnitude of the second transmission power, based on the PDSCH scheduling rate being included in the first range, the at least one processor may be configured to refrain from transmitting the at least one SRS, when it is identified that difference between an SRS target power for transmitting the at least one SRS by the electronic device and a maximum power supported by the electronic device is included in a second range, or transmit the at least one SRS at the magnitude of the second transmission power.

According to various embodiments, as at least part of the refraining from transmitting the at least one SRS in the at least one resource, or transmitting the at least one SRS with the magnitude of the second transmission power, based on the PDSCH scheduling rate being included in the first range, the at least one processor may be configured to refrain from transmitting the at least one SRS, when it is identified that the SRS target power for transmitting the at least one SRS by the electronic device is included in a third range, or transmit the at least one SRS at the magnitude of the second transmission power.

According to various example embodiments, the at least one processor may be additionally configured to identify at least one first parameter related to reception strength, while refraining from transmitting the at least one SRS or while transmitting the at least one SRS at the magnitude of the second transmission power, and transmit the at least one SRS transmission at the magnitude of the first transmission power, based on the at least one first parameter satisfying a specified condition.

According to various embodiments, as at least a part of the transmitting the at least one SRS transmission at the magnitude of the first transmission power, based on the at least one first parameter satisfying a specified condition, the at least one processor may be configured to transmit the at least one SRS transmission at the magnitude of the first transmission power, based on a comparison result between at least one second parameter and the first parameter satisfying a first specified condition, wherein the at least one second parameter is identified while the at least one SRS is transmitted, or transmit the at least one SRS transmission at the magnitude of the first transmission power, based on the at least one first parameter satisfying a second specified condition.

According to various example embodiments, when it is identified that the PDSCH scheduling rate is included in the first range and the electronic device is located in a weak electric field, the at least one processor may be additionally configured to transmit the at least one SRS transmission at the magnitude of the first transmission power.

According to various example embodiments, as at least part of the refraining from transmitting the at least one SRS in the at least one resource, or the transmitting the at least one SRS at the magnitude of the second transmission power, based on the PDSCH scheduling rate being included in the first range, the at least one processor may be configured to refrain from transmitting the at least one SRS when it is identified as a periodic SRS type or a semi-persistent type, or transmit the at least one SRS at the magnitude of the second transmission power.

According to various example embodiments, the at least one processor may be additionally configured to transmit, based on an aperiodic SRS type being identified, the at least one SRS transmission at the magnitude of the first transmission power while the PDSCH scheduling rate is included in the first range.

According to various example embodiments, an operation method of an electronic device may include identifying a sounding reference signal (SRS) configuration received from a network, identifying a physical downlink shared channel (PDSCH) scheduling rate corresponding to the electronic device, transmitting, based on the PDSCH scheduling rate not being included in a first range, at least one SRS at a magnitude of first transmission power in at least one resource for SRS signal transmission identified based on the SRS configuration, and based on the PDSCH scheduling rate being included in the first range, refraining from transmitting the at least one SRS in the at least one resource, or transmitting the at least one SRS at a magnitude of second transmission power in the at least one resource, wherein the magnitude of the second transmission power is different from the magnitude of the first transmission power. The SRS configuration may be configured by the network corresponding to the plurality of antennas of the electronic device. The PDSCH scheduling rate may be a ratio of scheduled slots among total slots of the PDSCH corresponding to the electronic device for a specified period.

According to various example embodiments, the transmitting the at least one SRS at the magnitude of the second transmission power, based on the PDSCH scheduling rate being included in the first range may include determining a magnitude of pre-specified transmission power as the magnitude of the second transmission power, determining a magnitude of transmission power, obtained by backing off a first value from the magnitude of the first transmission power, as the magnitude of the second transmission power, or determining a magnitude of transmission power, obtained by multiplying the magnitude of the first transmission power by a second value, as the magnitude of the second transmission power.

According to various example embodiments, the determining the magnitude of the transmission power, obtained by backing off a first value from the magnitude of the first transmission power, as the magnitude of the second transmission power may include determining the magnitude of the second transmission power by subtracting the first value, which is a specified back-off value, from the magnitude of the first transmission power, or determining the magnitude of the second transmission power by subtracting the first value, which is identified based on the magnitude of the first transmission power, from the magnitude of the first transmission power.

According to various example embodiments, the refraining from transmitting the at least one SRS or the transmitting the at least one SRS at the magnitude of the second transmission power in the at least one resource based on the PDSCH scheduling rate being included in the first range may include refraining from transmitting the at least one SRS, when it is identified that a difference between an SRS target power for transmitting the at least one SRS by the electronic device and a maximum power supported by the electronic device is included in a second range, or transmitting the at least one SRS at the magnitude of the second transmission power.

According to various example embodiments, the refraining from transmitting the at least one SRS or the transmitting the at least one SRS at the magnitude of the second transmission power in the at least one resource based on the PDSCH scheduling rate being included in the first range may include refraining from transmitting the at least one SRS, when it is identified that the SRS target power for transmitting the at least one SRS by the electronic device is included in a third range, or transmitting the at least one SRS at the magnitude of the second transmission power.

According to various example embodiments, an operation method of an electronic device may additionally include identifying at least one first parameter related to reception strength, while refraining from transmitting the at least one SRS or while transmitting the at least one SRS at the magnitude of the second transmission power, and transmitting the at least one SRS transmission at the magnitude of the first transmission power, based on the at least one first parameter satisfying a specified condition.

According to various example embodiments, the transmitting the at least one SRS transmission at the magnitude of the first transmission power, based on the at least one first parameter satisfying a specified condition, may transmit the at least one SRS transmission at the magnitude of the first transmission power, based on a comparison result between at least one second parameter and the first parameter satisfying a first specified condition, wherein the at least one second parameter is identified while the at least one SRS is transmitted, or transmit the at least one SRS transmission at the magnitude of the first transmission power, based on the at least one first parameter satisfying a second specified condition.

According to various example embodiments, when it is identified that the PDSCH scheduling rate is included in the first range and the electronic device is located in a weak electric field, an operation method of an electronic device may additionally include transmitting the at least one SRS transmission at the magnitude of the first transmission power.

According to various example embodiments, the refraining from transmitting the at least one SRS in the at least one resource, or the transmitting the at least one SRS at the magnitude of the second transmission power, based on the PDSCH scheduling rate being included in the first range, may refrain from transmitting the at least one SRS when it is identified as a periodic SRS type or a semi-persistent type, or transmit the at least one SRS at the magnitude of the second transmission power.

According to various example embodiments, an operation method of an electronic device may additionally include transmitting, based on an aperiodic SRS type being identified, the at least one SRS transmission at the magnitude of the first transmission power while the PDSCH scheduling rate is included in the first range.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, where the term "non-transitory" refers to the storage medium being a tangible device, and does not include a signal (e.g., an electromagnetic wave), but this term does not differentiate between data being semi-permanently stored in the storage medium and the data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a plurality of antennas;
memory, including one or more storage media, storing instructions;
at least one processor including processing circuitry,
wherein the instructions, when executed by at least one processor individually or collectively, cause the electronic device to:
identify a sounding reference signal (SRS) configuration received from a network, wherein the SRS configuration is configured by the network corresponding to the plurality of antennas;
identify a physical downlink shared channel (PDSCH) scheduling rate corresponding to the electronic device, wherein the PDSCH scheduling rate is a ratio of scheduled slots among total slots of the PDSCH corresponding to the electronic device for a specified period;
based on the PDSCH scheduling rate not being included in a first range:
transmit at least one SRS at a magnitude of first transmission power through each of at least one of the plurality of antennas, in each of at least one resource for SRS signal transmission identified based on the SRS configuration; and
based on the PDSCH scheduling rate being included in the first range:
refrain from transmitting the at least one SRS in the at least one resource, or
transmit the at least one SRS at a magnitude of second transmission power, through at least one of the plurality of antennas, in the at least one resource, respectively, wherein the magnitude of the second transmission power is different from the magnitude of the first transmission power.

2. The electronic device of claim 1, wherein, as at least a part of the transmitting the at least one SRS at the magnitude of the second transmission power based on the PDSCH scheduling rate being included in the first range, instructions, when executed by at least one processor, comprising processing circuitry, individually or collectively cause the electronic device to:
determine, as the magnitude of the second transmission power, a magnitude of pre-specified transmission power;
determine, as the magnitude of the second transmission power, a magnitude of transmission power, obtained by backing off a first value from the magnitude of the first transmission power; or
determine, as the magnitude of the second transmission power, a magnitude of transmission power, obtained by multiplying the magnitude of the first transmission power by a second value.

3. The electronic device of claim 2, wherein, as at least a part of the determining the magnitude of the second transmission power, obtained by backing off a first value from the magnitude of the first transmission power, instructions, when executed by at least one processor, comprising processing circuitry, individually or collectively cause the electronic device to:
determine the magnitude of the second transmission power by subtracting the first value, which is a specified back-off value, from the magnitude of the first transmission power, or
determine the magnitude of the second transmission power by subtracting the first value, which is identified based on the magnitude of the first transmission power, from the magnitude of the first transmission power.

4. The electronic device of claim 1, wherein, as at least a part of the refraining from transmitting the at least one SRS in the at least one resource, or the transmitting the at least one SRS at the magnitude of the second transmission power, based on the PDSCH scheduling rate being included in the first range, instructions, when executed by at least one processor, comprising processing circuitry, individually or collectively cause the electronic device to:
refrain from transmitting the at least one SRS, based on identifying that a difference between an SRS target power for transmitting the at least one SRS by the electronic device and a maximum power supported by the electronic device is included in a second range; or
transmit the at least one SRS at the magnitude of the second transmission power.

5. The electronic device of claim 4, wherein, as at least part of the refraining from transmitting the at least one SRS in the at least one resource, or transmitting the at least one SRS with the magnitude of the second transmission power, based on the PDSCH scheduling rate being included in the first range, instructions, when executed by at least one processor, comprising processing circuitry, individually or collectively cause the electronic device to:
refrain from transmitting the at least one SRS, based on identifying that the SRS target power for transmitting the at least one SRS by the electronic device is included in a third range; or
transmit the at least one SRS at the magnitude of the second transmission power.

6. The electronic device of claim 1, wherein instructions, when executed by at least one processor, comprising processing circuitry, individually or collectively cause the electronic device to:
identify at least one first parameter related to reception strength, while refraining from transmitting the at least one SRS or while transmitting the at least one SRS at the magnitude of the second transmission power; and
transmit the at least one SRS transmission at the magnitude of the first transmission power, based on the at least one first parameter satisfying a specified condition.

7. The electronic device of claim 6, wherein, as at least a part of the transmitting the at least one SRS transmission at the magnitude of the first transmission power, based on the at least one first parameter satisfying a specified condition, instructions, when executed by at least one processor, comprising processing circuitry, individually or collectively cause the electronic device to:
transmit the at least one SRS transmission at the magnitude of the first transmission power, based on a comparison result between at least one second parameter and the at least one first parameter satisfying a first specified condition, wherein the at least one second parameter is identified while the at least one SRS is transmitted; or
transmit the at least one SRS transmission at the magnitude of the first transmission power, based on the at least one first parameter satisfying a second specified condition.

8. The electronic device of claim 1, wherein, based on identifying that the PDSCH scheduling rate is included in the first range and the electronic device is located in a weak electric field, instructions, when executed by at least one processor, comprising processing circuitry, individually or collectively cause the electronic device to:
    transmit the at least one SRS transmission at the magnitude of the first transmission power.

9. The electronic device of claim 1, wherein, as at least part of the refraining from transmitting the at least one SRS in the at least one resource, or the transmitting the at least one SRS at the magnitude of the second transmission power, based on the PDSCH scheduling rate being included in the first range, instructions, when executed by at least one processor, comprising processing circuitry, individually or collectively cause the electronic device to:
    refrain from transmitting the at least one SRS based on identifying the at least one SRS as a periodic SRS type or a semi-persistent type; or
    transmit the at least one SRS at the magnitude of the second transmission power.

10. The electronic device of claim 1, wherein instructions, when executed by at least one processor, comprising processing circuitry, individually or collectively cause the electronic device to:
    transmit, based on an aperiodic SRS type being identified, the at least one SRS transmission at the magnitude of the first transmission power while the PDSCH scheduling rate is included in the first range.

11. An operation method of an electronic device, comprising:
    identifying a sounding reference signal (SRS) configuration received from a network, wherein the SRS configuration is configured by the network corresponding to a plurality of antennas;
    identifying a physical downlink shared channel (PDSCH) scheduling rate corresponding to the electronic device, wherein the PDSCH scheduling rate is a ratio of scheduled slots among total slots of the PDSCH corresponding to the electronic device for a specified period;
    based on the PDSCH scheduling rate not being included in a first range:
        transmitting at least one SRS at a magnitude of first transmission power in at least one resource for SRS signal transmission identified based on the SRS configuration; and
    based on the PDSCH scheduling rate being included in the first range:
        refraining from transmitting the at least one SRS in the at least one resource, or
        transmitting the at least one SRS at a magnitude of second transmission power, wherein the magnitude of second transmission power is different from the magnitude of the first transmission power in the at least one resource.

12. The operation method of claim 11, wherein the transmitting of the at least one SRS at the magnitude of the second transmission power, based on the PDSCH scheduling rate being included in the first range comprises:
    determining, as the magnitude of the second transmission power, a magnitude of pre-specified transmission power;
    determining, as the magnitude of the second transmission power, a magnitude of transmission power, obtained by backing off a first value from the magnitude of the first transmission power; or
    determining, as the magnitude of the second transmission power, a magnitude of transmission power, obtained by multiplying the magnitude of the first transmission power by a second value.

13. The operation method of claim 12, wherein the determining of the magnitude of the transmission power, obtained by backing off a first value from the magnitude of the first transmission power, as the magnitude of the second transmission power comprises:
    determining the magnitude of the second transmission power by subtracting the first value, which is a specified back-off value, from the magnitude of the first transmission power; or
    determining the magnitude of the second transmission power by subtracting the first value from the magnitude of the first transmission power, wherein the first value is identified based on the magnitude of the first transmission power.

14. The operation method of claim 11, wherein the refraining from transmitting the at least one SRS or the transmitting the at least one SRS at the magnitude of the second transmission power in the at least one resource, based on the PDSCH scheduling rate being is included in the first range, comprises:
    refraining from transmitting the at least one SRS, based on identifying that a difference between an SRS target power for transmitting the at least one SRS by the electronic device and a maximum power supported by the electronic device is included in a second range; or
    transmitting the at least one SRS at the magnitude of the second transmission power.

15. The operation method of claim 14, wherein the refraining from transmitting the at least one SRS or the transmitting the at least one SRS at the magnitude of the second transmission power in the at least one resource, based on the PDSCH scheduling rate being included in the first range comprises:
    refraining from transmitting the at least one SRS, based on identifying that the SRS target power for transmitting the at least one SRS by the electronic device is included in a third range; or
    transmitting the at least one SRS at the magnitude of the second transmission power.

16. The operation method of claim 11, wherein the method further comprises:
    identifying at least one first parameter related to reception strength, while refraining from transmitting the at least one SRS or while transmitting the at least one SRS at the magnitude of the second transmission power; and
    transmitting the at least one SRS transmission at the magnitude of the first transmission power, based on the at least one first parameter satisfying a specified condition.

17. The operation method of claim 16, wherein, the transmitting the at least one SRS transmission at the magnitude of the first transmission power, based on the at least one first parameter satisfying a specified condition comprises:
    transmitting the at least one SRS transmission at the magnitude of the first transmission power, based on a comparison result between at least one second parameter and the at least one first parameter satisfying a first specified condition, wherein the at least one second parameter is identified while the at least one SRS is transmitted; or transmitting the at least one SRS transmission at the magnitude of the first transmission power, based on the at least one first parameter satisfying a second specified condition.

18. The operation method of claim 11, wherein, based on identifying that the PDSCH scheduling rate is included in the first range and the electronic device is located in a weak electric field, the method further comprises transmitting the at least one SRS transmission at the magnitude of the first transmission power.

19. The operation method of claim 11, wherein, the refraining from transmitting the at least one SRS in the at least one resource, or the transmitting the at least one SRS at the magnitude of the second transmission power, based on the PDSCH scheduling rate being included in the first range comprises:
- refraining from transmitting the at least one SRS based on identifying the at least one SRS as a periodic SRS type or a semi-persistent type; or
- transmitting the at least one SRS at the magnitude of the second transmission power.

20. The operation method of claim 11, wherein the method further comprises transmitting, based on an aperiodic SRS type being identified, the at least one SRS transmission at the magnitude of the first transmission power while the PDSCH scheduling rate is included in the first range.

\* \* \* \* \*